US011729675B2

(12) United States Patent
Chong et al.

(10) Patent No.: US 11,729,675 B2
(45) Date of Patent: Aug. 15, 2023

(54) METHOD AND APPARATUS FOR PERFORMING A VOICE SERVICE HANDOVER TO A CIRCUIT SWITCHED DOMAIN VOICE SERVICE

(71) Applicant: HUAWEI TECHNOLOGIES CO., LTD., Guangdong (CN)

(72) Inventors: Weiwei Chong, Shanghai (CN); Xiaobo Wu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 231 days.

(21) Appl. No.: 17/134,872

(22) Filed: Dec. 28, 2020

(65) Prior Publication Data

US 2021/0120461 A1    Apr. 22, 2021

Related U.S. Application Data

(63) Continuation of application No. PCT/CN2019/091813, filed on Jun. 19, 2019.

(30) Foreign Application Priority Data

Jul. 12, 2018 (CN) .......................... 201810764299.6

(51) Int. Cl.
*H04W 36/00* (2009.01)
*H04W 36/14* (2009.01)

(52) U.S. Cl.
CPC ... *H04W 36/0022* (2013.01); *H04W 36/0033* (2013.01); *H04W 36/14* (2013.01)

(58) Field of Classification Search
CPC ............. H04W 36/14; H04W 36/0022; H04W 36/0033; H04W 36/0066; H04W 36/00;
(Continued)

(56) References Cited

U.S. PATENT DOCUMENTS

2018/0132141 A1   5/2018   Huang-Fu et al.
2020/0252849 A1*  8/2020   Tang ....................... H04W 8/08
(Continued)

FOREIGN PATENT DOCUMENTS

CN    108174423 A   6/2018
CN    109041149 A   12/2018
(Continued)

OTHER PUBLICATIONS

China Unicom et al,"Potential implementations of voice service continuity from 5G to 2/3G", 3GPP TSG-SA WG1 Meeting #80, S1-174157, Reno, USA, Nov. 25-Dec. 1, 2017, total 6 pages.
(Continued)

*Primary Examiner* — Allahyar Kasraian
(74) *Attorney, Agent, or Firm* — Womble Bond Dickinson (US) LLP

(57) ABSTRACT

A method includes: receiving session management information from a session management network element in a first network, where the session management information is used to request to establish a user plane tunnel of a voice service of a terminal device in the first network; and sending a handover request to a mobility management network element in the first network based on the session management information to indicate a handover of the terminal device from the first network to a second network that supports a circuit switched domain voice service. When the access network device in the first network receives the session management information to request to establish the user plane tunnel, the handover request is sent to the mobility management network element in the first network based on the session management information to establish a circuit switched domain voice service of the terminal device in the second network.

19 Claims, 10 Drawing Sheets

(58) Field of Classification Search
CPC ............. H04W 36/08; H04W 36/0027; H04W 36/0083; H04W 36/00837
See application file for complete search history.

(56) References Cited

U.S. PATENT DOCUMENTS

| | | | | |
|---|---|---|---|---|
| 2020/0322850 | A1* | 10/2020 | Zhu | H04W 76/25 |
| 2020/0329404 | A1* | 10/2020 | Vikberg | H04L 65/1016 |
| 2021/0029594 | A1* | 1/2021 | Kunz | H04W 36/0066 |

FOREIGN PATENT DOCUMENTS

| | | | |
|---|---|---|---|
| CN | 109257779 | A | 1/2019 |
| CN | 109257780 | A | 1/2019 |
| CN | 109257788 | A | 1/2019 |
| CN | 109819481 | A | 5/2019 |
| WO | 2017201694 | A1 | 11/2017 |
| WO | 2018065936 | A1 | 4/2018 |

OTHER PUBLICATIONS

Huawei et al,"Support EPS fallback for voice in NR", 3GPP TSG-RAN WG2 Meeting 101, R2-1802288, Athens, Greece, Feb. 26-Mar. 3, 2018, total 3 pages.

3GPP TS 23.216 V15.2.0 (Jun. 2018),3rd Generation Partnership Project Technical Specification Group Services and System Aspects;Single Radio Voice Call Continuity (SRVCC);Stage 2(Release 15), total 69 pages.

3GPP TS 23.502 V15.2.0 (Jun. 2018),3rd Generation Partnership Project Technical Specification Group Services and System Aspects;Procedures for the 5G System; Stage 2(Release 15), total 308 pages.

Huawei et al: "Support EPS fallback for voice in NR", 3GPP Draft; R2-1802288,Feb. 15, 2018, XP051399447, total 3 pages, Feb. 26 to Mar. 3, 2018.

China Unicom et al: "Potential implementations of voice service continuity from 5G to 2/3G", 3GPP Draft; S1-174157,Nov. 15, 2017, XP051378788, total 6 pages, Feb. 26 to Mar. 3, 2018.

* cited by examiner

METHOD AND APPARATUS FOR
PERFORMING A VOICE SERVICE
HANDOVER TO A CIRCUIT SWITCHED
DOMAIN VOICE SERVICE

CROSS-REFERENCE TO RELATED
APPLICATIONS

This application is a continuation of International Application No. PCT/CN2019/091813, filed on Jun. 19, 2019, which claims priority to Chinese Patent Application No. 201810764299.6, filed on Jul. 12, 2018. The disclosures of the aforementioned applications are hereby incorporated by reference in their entireties.

TECHNICAL FIELD

Embodiments of the present invention relate to the field of communications technologies, and in particular, to a voice service establishment method and apparatus.

BACKGROUND

When a terminal device is located in a signal coverage area of a fifth-generation (5G for short) network, a voice service of the terminal device may fail to be established in the 5G network for some reasons. For example, many operators do not deploy a voice service in the 5G network, and consequently the voice service of the terminal device cannot be established. For another example, the 5G network fails to meet a voice service establishment requirement: The 5G network usually uses a high-frequency signal, and a signal coverage area of the high-frequency signal is relatively small. However, a voice service in the 5G network requires a relatively large signal coverage area. Consequently, the voice service of the terminal device cannot be established.

Further, an operator does not deploy a voice service in an evolved packet system (EPS for short) network, namely, a 4th generation (4G for short) network, or some operators do not deploy an EPS network, but directly deploy the 5G network after a 2G/3G (second generation/third generation) network. Consequently, the voice service of the terminal device cannot be established in the EPS network.

Therefore, when the terminal device is located in the signal coverage area of the 5G network, and the voice service of the terminal device cannot be established in the 5G network or in the EPS network, how to establish the voice service of the terminal device is a technical problem to be urgently resolved currently.

SUMMARY

Embodiments of the present invention provide a voice service establishment method and apparatus, to resolve a technical problem that a voice service of a terminal device cannot be established.

In view of this, technical solutions for resolving the technical problem in the embodiments of the present invention are as follows:

According to a first aspect, a voice service establishment method is provided, and the method includes:

an access network device in a first network receives session management information from a session management network element in the first network, where the session management information is used to request to establish a user plane tunnel of a voice service of a terminal device in the first network; and the access network device in the first network sends a handover request to a mobility management network element in the first network based on the session management information, where the handover request is used to indicate a handover of the terminal device from the first network to a second network that supports a circuit switched domain voice service.

According to the method provided in the first aspect, when the access network device in the first network receives the session management information used to request to establish the user plane tunnel of the voice service of the terminal device in the first network, it indicates that the terminal device is located in the first network. In this case, if the voice service of the terminal device cannot be established in the first network, the access network device in the first network sends the handover request to the mobility management network element in the first network based on the session management information, where the handover request is used to indicate the handover of the terminal device from the first network to the second network, to establish a circuit switched domain voice service of the terminal device in the second network.

In an embodiment, the handover request is used to indicate a handover of the voice service of the terminal device from the first network to the second network.

In an embodiment, the method further includes: The access network device in the first network determines that the access network device in the first network has a first handover capability. The first handover capability includes a capability of triggering the handover of the terminal device from the first network to the second network.

In an embodiment, before sending the handover request, the access network device in the first network determines that the access network device in the first network has the first handover capability, to determine handover feasibility.

In an embodiment, the first handover capability includes a capability of triggering the handover of the voice service of the terminal device from the first network to the second network.

In an embodiment, the first handover capability includes a capability of triggering the handover of the terminal device from the first network to the second network based on the session management information.

In an embodiment, the method further includes: The access network device in the first network determines that a first handover condition is met. The first handover condition includes one or more of the following conditions: The terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In an embodiment, before sending the handover request, the access network device in the first network determines that a current network environment is suitable for the handover of the terminal device from the first network to the second network, to determine handover feasibility.

In an embodiment, the method further includes: The access network device in the first network determines that a core network device in the first network has a second handover capability. The second handover capability includes a capability of supporting the handover of the terminal device from the first network to the second network. The core network device in the first network includes one or more of the following network elements: the mobility management network element in the first network, the session management network element in the first network, and a user plane function network element in the first network.

In an embodiment, before sending the handover request, the access network device in the first network determines that the core network device in the first network has the second handover capability, to determine handover feasibility.

In an embodiment, the second handover capability includes a capability of supporting the handover of the voice service of the terminal device from the first network to the second network.

In an embodiment, the method further includes: The access network device in the first network determines that the terminal device has a third handover capability. The third handover capability includes a capability of supporting a handover from an internet protocol multimedia subsystem voice service to a circuit switched domain voice service.

In an embodiment, before sending the handover request, the access network device in the first network determines that the terminal device has the third handover capability, to determine handover feasibility.

In an embodiment, the method further includes: The access network device in the first network determines that the terminal device subscribes to a service for handing over a voice service from the first network to the second network.

In an embodiment, before sending the handover request, the access network device in the first network determines that the terminal device subscribes to a service related to voice service handover, to determine handover feasibility.

In an embodiment, the method further includes: The access network device in the first network forbids, based on the session management information, an operation of allocating a radio resource of the first network to the voice service of the terminal device.

In an embodiment, the access network device in the first network forbids the operation of allocating the radio resource of the first network, to save the radio resource of the first network.

In an embodiment, the method further includes: The access network device in the first network sends first information to the session management network element in the first network. The first information is used to notify the session management network element in the first network of the handover of the terminal device from the first network to the second network.

In an embodiment, the first information is used to notify the session management network element in the first network of the handover of the voice service of the terminal device from the first network to the second network. In a possible design, the method further includes:

The access network device in the first network sends second information to the mobility management network element in the first network. The second information is used to indicate returning of the terminal device from the second network to the first network after the voice service of the terminal device ends.

In an embodiment, after the voice service of the terminal device in the second network ends, the terminal device is immediately returned to the first network.

In an embodiment, the second information is used to indicate returning of the voice service of the terminal device from the second network to the first network after the voice service of the terminal device ends. In a possible design, the method further includes:

The access network device in the first network sends, to the mobility management network element in the first network, at least one of information about whether the access network device in the first network has the first handover capability and information about whether the terminal device has the third handover capability. The first handover capability includes the capability of triggering the handover of the terminal device from the first network to the second network, and the third handover capability includes the capability of supporting the handover from the internet protocol multimedia subsystem voice service of the terminal device to the circuit switched domain voice service of the terminal device.

According to a second aspect, an information processing method is provided, and the method includes:

a session management network element in a first network receives third information from an access network device in the first network, where the third information is used to indicate that establishment of a user plane tunnel of a voice service of a terminal device in the first network is accepted or rejected; and the session management network element in the first network sends fourth information to a user plane function network element in the first network, where the fourth information is used to instruct the user plane function network element in the first network to stop forwarding a data packet of the voice service of the terminal device.

According to the method provided in the second aspect, the user plane function network element in the first network is instructed to stop forwarding the data packet of the voice service of the terminal device, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

In an embodiment, the method further includes: The session management network element in the first network receives first information from the access network device in the first network. The first information is used to notify a handover of the terminal device from the first network to a second network.

In an embodiment, the first information is used to notify a handover of the voice service of the terminal device from the first network to the second network.

In an embodiment, that the session management network element in the first network sends fourth information to a user plane function network element in the first network includes:

The session management network element in the first network sends the fourth information to the user plane function network element in the first network based on the first information.

According to a third aspect, an information processing method is provided, and the method includes:

a user plane function network element in a first network receives fourth information from a session management network element in the first network; and the user plane function network element in the first network stops, based on the fourth information, forwarding a data packet of a voice service of a terminal device.

According to the method provided in the third aspect, the user plane function network element in the first network stops forwarding the data packet of the voice service of the terminal device, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

According to a fourth aspect, an information processing method is provided, and the method includes:

a session management network element in a first network receives third information from an access network device in the first network, where the third information is used to indicate that establishment of a user plane tunnel of a voice service of a terminal device in the first network is accepted or rejected; and the session management network element in the first network forbids an operation of establishing a core network tunnel corresponding to the user plane tunnel.

According to the method provided in the fourth aspect, the session management network element in the first network forbids the operation of establishing the core network tunnel, so that a network device and the terminal device in the first network are prevented from performing unnecessary operations, to save network resources.

In an embodiment, that the session management network element in the first network forbids an operation of establishing a core network tunnel corresponding to the user plane tunnel includes:

The session management network element in the first network forbids sending fifth information to a user plane function network element in the first network. The fifth information is used to instruct the user plane function network element in the first network to establish the corresponding core network tunnel for the user plane tunnel.

In an embodiment, that the session management network element in the first network forbids an operation of establishing a core network tunnel corresponding to the user plane tunnel includes:

The session management network element in the first network sends sixth information to a user plane function network element in the first network. The sixth information is used to instruct to forbid the user plane function network element in the first network to establish the corresponding core network tunnel for the user plane tunnel.

In an embodiment, the method further includes: The session management network element in the first network receives first information from the access network device in the first network. The first information is used to notify a handover of the terminal device from the first network to a second network.

In an embodiment, the first information is used to notify a handover of the voice service of the terminal device from the first network to the second network.

In an embodiment, that the session management network element in the first network forbids an operation of establishing a core network tunnel corresponding to the user plane tunnel includes:

The session management network element in the first network forbids, based on the first information, the operation of establishing the core network tunnel corresponding to the user plane tunnel.

According to a fifth aspect, a network handover method is provided, and includes:

a mobile switching network element in a second network obtains second information from a mobility management network element in a first network, where the second information is used to indicate returning of a terminal device from the second network to the first network after a voice service in the second network ends, and the voice service in the second network is a voice service handed over from the first network to the second network; and the mobile switching network element in the second network sends seventh information to a base station in the second network based on the second information, where the seventh information is used to instruct the base station in the second network to trigger returning of the terminal device to the first network after the voice service in the second network ends.

According to the method provided in the fifth aspect, after the voice service of the terminal device in the second network ends, the terminal device is immediately returned to the first network.

In an embodiment, the seventh information includes at least one of the second information and identification information of the first network.

In an embodiment, the seventh information is used to instruct the base station in the second network to trigger returning of the voice service of the terminal device to the first network after the voice service in the second network ends.

According to a sixth aspect, an information obtaining method is provided, and includes:

a mobility management network element in a first network receives a registration request from a terminal device, where the registration request is used to request to register the terminal device with the first network; and the mobility management network element in the first network sends eighth information to the terminal device based on the registration request and a second handover condition, where the eighth information indicates that a packet switched domain voice service is supported, the second handover condition includes: The first network supports a handover of the terminal device from the first network to a second network, and the second network supports a circuit switched domain voice service.

According to the method provided in the sixth aspect, when the terminal device registers with the first network, the first network does not need to really support the packet switched domain voice service of the terminal device, and if it is determined that the second handover condition is met, that is, the first network supports the handover of the terminal device from the first network to the second network, it may be considered that the packet switched domain voice service is supported. Therefore, the terminal device does not need to be handed over to another network through reselection, and the terminal device in the first network may enjoy a high-speed data service before a voice service is established.

In an embodiment, the second handover condition includes: The first network supports a handover of the voice service of the terminal device from the first network to the second network.

In an embodiment, the second handover condition includes: An access network device in the first network has a first handover capability. The first handover capability includes a capability of triggering the handover of the terminal device from the first network to the second network.

In an embodiment, before sending the eighth information, the mobility management network element in the first network determines that the access network device in the first network has the first handover capability, to determine handover feasibility.

In an embodiment, the first handover capability includes a capability of triggering the handover of the voice service of the terminal device from the first network to the second network.

In an embodiment, the first handover capability includes a capability of triggering the handover of the terminal device from the first network to the second network based on session management information. The session management information is used to request to establish a user plane tunnel of the voice service of the terminal device in the first network.

In an embodiment, the second handover condition further includes: A core network device in the first network has a second handover capability. The second handover capability includes a capability of supporting the handover of the terminal device from the first network to the second network. The core network device in the first network includes one or more of the following network elements: the mobility management network element in the first network, a session management network element in the first network, and a user plane function network element in the first network.

In an embodiment, before sending the eighth information, the mobility management network element in the first network determines that the core network device in the first network has the second handover capability, to determine handover feasibility.

In an embodiment, the second handover capability includes a capability of supporting the handover of the voice service of the terminal device from the first network to the second network.

In an embodiment, the second handover condition further includes:

The terminal device has a third handover capability. The third handover capability includes a capability of supporting a handover from an internet protocol multimedia subsystem voice service to a circuit switched domain voice service.

In an embodiment, before sending the eighth information, the mobility management network element in the first network determines that the terminal device has the third handover capability, to determine handover feasibility.

In an embodiment, the second handover condition further includes one or more of the following conditions: The terminal device subscribes to a service for handing over a voice service from the first network to the second network, the terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In an embodiment, before sending the eighth information, the mobility management network element in the first network determines that a current network environment is suitable for the handover of the terminal device from the first network to the second network or the terminal device subscribes to a service related to voice handover, to determine handover feasibility.

According to a seventh aspect, a voice service establishment apparatus is provided, and the apparatus includes:

a receiving unit, configured to receive session management information from a session management network element in a first network, where the session management information is used to request to establish a user plane tunnel of a voice service of a terminal device in the first network; and a sending unit, configured to send a handover request to a mobility management network element in the first network based on the session management information, where the handover request is used to indicate a handover of the terminal device from the first network to a second network that supports a circuit switched domain voice service.

According to the apparatus provided in the seventh aspect, when the receiving unit receives the session management information used to request to establish the user plane tunnel of the voice service of the terminal device in the first network, it indicates that the terminal device is located in the first network. In this case, if the voice service of the terminal device cannot be established in the first network, the sending unit sends the handover request to the mobility management network element in the first network based on the session management information, where the handover request is used to indicate the handover of the terminal device from the first network to the second network, to establish a circuit switched domain voice service of the terminal device in the second network.

In an embodiment, the handover request is used to indicate a handover of the voice service of the terminal device from the first network to the second network.

In an embodiment, the apparatus further includes:

a first determining unit, configured to determine that an access network device in the first network has a first handover capability. The first handover capability includes a capability of triggering the handover of the terminal device from the first network to the second network.

In this design, before the sending unit sends the handover request, the first determining unit determines that the access network device in the first network has the first handover capability, to determine handover feasibility.

In an embodiment, the first handover capability includes a capability of triggering the handover of the voice service of the terminal device from the first network to the second network.

In an embodiment, the first handover capability includes a capability of triggering the handover of the terminal device from the first network to the second network based on the session management information.

In an embodiment, the apparatus further includes:

a second determining unit, configured to determine that a first handover condition is met. The first handover condition includes one or more of the following conditions: The terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In an embodiment, before the sending unit sends the handover request, the second determining unit determines that a current network environment is suitable for the handover of the terminal device from the first network to the second network, to determine handover feasibility.

In an embodiment, the apparatus further includes:

a third determining unit, configured to determine that a core network device in the first network has a second handover capability. The second handover capability includes a capability of supporting the handover of the terminal device from the first network to the second network. The core network device in the first network includes one or more of the following network elements: the mobility management network element in the first network, the session management network element in the first network, and a user plane function network element in the first network.

In an embodiment, before the sending unit sends the handover request, the third determining unit determines that the core network device in the first network has the second handover capability, to determine handover feasibility.

In an embodiment, the second handover capability includes a capability of supporting the handover of the voice service of the terminal device from the first network to the second network.

In an embodiment, the apparatus further includes:

a fourth determining unit, configured to determine that the terminal device has a third handover capability. The third handover capability includes a capability of supporting a handover from an internet protocol multimedia subsystem voice service to a circuit switched domain voice service.

In an embodiment, before the sending unit sends the handover request, the fourth determining unit determines that the terminal device has the third handover capability, to determine handover feasibility.

In an embodiment, the apparatus further includes:

a fifth determining unit, configured to determine that the terminal device subscribes to a service for handing over a voice service from the first network to the second network.

In an embodiment, before the sending unit sends the handover request, the fifth determining unit determines that the terminal device subscribes to a service related to voice service handover, to determine handover feasibility.

In an embodiment, the apparatus further includes:

a control unit, configured to forbid, based on the session management information, an operation of allocating a radio resource of the first network to the voice service of the terminal device.

In an embodiment, the control unit forbids the operation of allocating the radio resource of the first network, to save the radio resource of the first network.

In an embodiment, the sending unit is further configured to send first information to the session management network element in the first network. The first information is used to notify the session management network element in the first network of the handover of the terminal device from the first network to the second network.

In an embodiment, the sending unit is further configured to send second information to the mobility management network element in the first network. The second information is used to indicate returning of the terminal device from the second network to the first network after the voice service of the terminal device ends.

In an embodiment, after the voice service of the terminal device in the second network ends, the terminal device is immediately returned to the first network.

In an embodiment, the second information is used to indicate returning of the voice service of the terminal device from the second network to the first network after the voice service of the terminal device ends.

In an embodiment, the sending unit is further configured to send, to the mobility management network element in the first network, at least one of information about whether the access network device in the first network has the first handover capability and information about whether the terminal device has the third handover capability. The first handover capability includes the capability of triggering the handover of the terminal device from the first network to the second network, and the third handover capability includes the capability of supporting the handover from the internet protocol multimedia subsystem voice service of the terminal device to the circuit switched domain voice service of the terminal device.

According to an eighth aspect, an information processing apparatus is provided, and the apparatus includes:

a receiving unit, configured to receive third information from an access network device in a first network, where the third information is used to indicate that establishment of a user plane tunnel of a voice service of a terminal device in the first network is accepted or rejected; and a sending unit, configured to send fourth information to a user plane function network element in the first network, where the fourth information is used to instruct the user plane function network element in the first network to stop forwarding a data packet of the voice service of the terminal device.

According to the apparatus provided in the eighth aspect, the user plane function network element in the first network is instructed to stop forwarding the data packet of the voice service of the terminal device, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

In an embodiment, the receiving unit is further configured to receive first information from the access network device in the first network. The first information is used to notify a handover of the terminal device from the first network to a second network.

In an embodiment, the first information is used to notify a handover of the voice service of the terminal device from the first network to the second network.

In an embodiment, the sending unit is configured to send the fourth information to the user plane function network element in the first network based on the first information.

According to a ninth aspect, an information processing apparatus is provided, and the apparatus includes:

a receiving unit, configured to receive fourth information from a session management network element in a first network; and a forwarding stop unit, configured to stop, based on the fourth information, forwarding a data packet of a voice service of a terminal device.

According to the apparatus provided in the ninth aspect, forwarding of the data packet of the voice service of the terminal device is stopped, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

According to a tenth aspect, an information processing apparatus is provided, and the apparatus includes:

a receiving unit, configured to receive third information from an access network device in a first network, where the third information is used to indicate that establishment of a user plane tunnel of a voice service of a terminal device in the first network is accepted or rejected; and an establishment forbidding unit, configured to forbid an operation of establishing a core network tunnel corresponding to the user plane tunnel.

According to the apparatus provided in the tenth aspect, the operation of establishing the core network tunnel is forbidden, so that a network device and the terminal device in the first network are prevented from performing unnecessary operations, to save network resources.

In an embodiment, the establishment forbidding unit is configured to forbid sending fifth information to a user plane function network element in the first network. The fifth information is used to instruct the user plane function network element in the first network to establish the corresponding core network tunnel for the user plane tunnel.

In an embodiment, the establishment forbidding unit is configured to send sixth information to a user plane function network element in the first network. The sixth information is used to instruct to forbid the user plane function network element in the first network to establish the corresponding core network tunnel for the user plane tunnel.

In an embodiment, the receiving unit is further configured to receive first information from the access network device in the first network. The first information is used to notify a handover of the terminal device from the first network to a second network.

In an embodiment, the first information is used to notify a handover of the voice service of the terminal device from the first network to the second network.

In an embodiment, the establishment forbidding unit is configured to forbid, based on the first information, the operation of establishing the core network tunnel corresponding to the user plane tunnel.

According to an eleventh aspect, a network handover apparatus is provided, and the apparatus includes:

an obtaining unit, configured to obtain second information from a mobility management network element in a first network, where the second information is used to indicate returning of a terminal device from a second network to the first network after a voice service in the second network ends, and the voice service in the second network is a voice service handed over from the first network to the second network; and a sending unit, configured to send seventh information to a base station in the second network based on the second information, where the seventh information is used to instruct the base station in the second network to trigger returning of the terminal device to the first network after the voice service in the second network ends.

According to the apparatus provided in the eleventh aspect, after the voice service of the terminal device in the second network ends, the terminal device is immediately returned to the first network.

In an embodiment, the seventh information includes at least one of the second information and identification information of the first network.

In an embodiment, the seventh information is used to instruct the base station in the second network to trigger returning of the voice service of the terminal device to the first network after the voice service in the second network ends.

According to a twelfth aspect, an information obtaining apparatus is provided, and the apparatus includes:

a receiving unit, configured to receive a registration request from a terminal device, where the registration request is used to request to register the terminal device with a first network; and a sending unit, configured to send eighth information to the terminal device based on the registration request and a second handover condition, where the eighth information indicates that a packet switched domain voice service is supported, the second handover condition includes: The first network supports a handover of the terminal device from the first network to a second network, and the second network supports a circuit switched domain voice service.

According to the apparatus provided in the twelfth aspect, when the terminal device registers with the first network, the first network does not need to really support the packet switched domain voice service of the terminal device, and if it is determined that the second handover condition is met, that is, the first network supports the handover of the terminal device from the first network to the second network, it may be considered that the packet switched domain voice service is supported. Therefore, the terminal device does not need to be handed over to another network through reselection, and the terminal device in the first network may enjoy a high-speed data service before a voice service is established.

In an embodiment, the second handover condition includes: The first network supports a handover of the voice service of the terminal device from the first network to the second network.

In an embodiment, the second handover condition includes: An access network device in the first network has a first handover capability. The first handover capability includes a capability of triggering the handover of the terminal device from the first network to the second network.

In an embodiment, before sending the eighth information, a mobility management network element in the first network determines that the access network device in the first network has the first handover capability, to determine handover feasibility.

In an embodiment, the first handover capability includes a capability of triggering the handover of the voice service of the terminal device from the first network to the second network.

In an embodiment, the first handover capability includes a capability of triggering the handover of the terminal device from the first network to the second network based on session management information. The session management information is used to request to establish a user plane tunnel of the voice service of the terminal device in the first network.

In an embodiment, the second handover condition further includes: A core network device in the first network has a second handover capability. The second handover capability includes a capability of supporting the handover of the terminal device from the first network to the second network. The core network device in the first network includes one or more of the following network elements: the mobility management network element in the first network, a session management network element in the first network, and a user plane function network element in the first network.

In an embodiment, before sending the eighth information, the apparatus determines that the core network device in the first network has the second handover capability, to determine handover feasibility.

In an embodiment, the second handover capability includes a capability of supporting the handover of the voice service of the terminal device from the first network to the second network.

In an embodiment, the second handover condition further includes:

The terminal device has a third handover capability. The third handover capability includes a capability of supporting a handover from an internet protocol multimedia subsystem voice service to a circuit switched domain voice service.

In an embodiment, before sending the eighth information, the apparatus determines that the terminal device has the third handover capability, to determine handover feasibility.

In an embodiment, the third handover capability includes at least one of a capability of supporting the handover from the internet protocol multimedia subsystem voice service to the circuit switched domain voice service before alerting and a capability of supporting the handover from the internet protocol multimedia subsystem voice service to the circuit switched domain voice service during alerting.

In an embodiment, the second handover condition further includes one or more of the following conditions: The terminal device subscribes to a service for handing over a voice service from the first network to the second network, the terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In an embodiment, before sending the eighth information, the apparatus determines that a current network environment is suitable for the handover of the terminal device from the first network to the second network or the terminal device subscribes to a service related to voice handover, to determine handover feasibility.

According to a thirteenth aspect, a computer-readable storage medium is provided, and includes an instruction. When the instruction runs on a computer, the computer is enabled to perform any one of the methods provided in the first aspect, the second aspect, the third aspect, the fourth aspect, the fifth aspect, and the sixth aspect.

According to a fourteenth aspect, a computer program product that includes an instruction is provided. When the computer program product runs on a computer, the computer is enabled to perform any one of the methods provided in the first aspect, the second aspect, the third aspect, the fourth aspect, the fifth aspect, and the sixth aspect.

BRIEF DESCRIPTION OF DRAWINGS

To describe the technical solutions in the embodiments of the present invention more clearly, the following briefly describes the accompanying drawings for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

Figure 1:
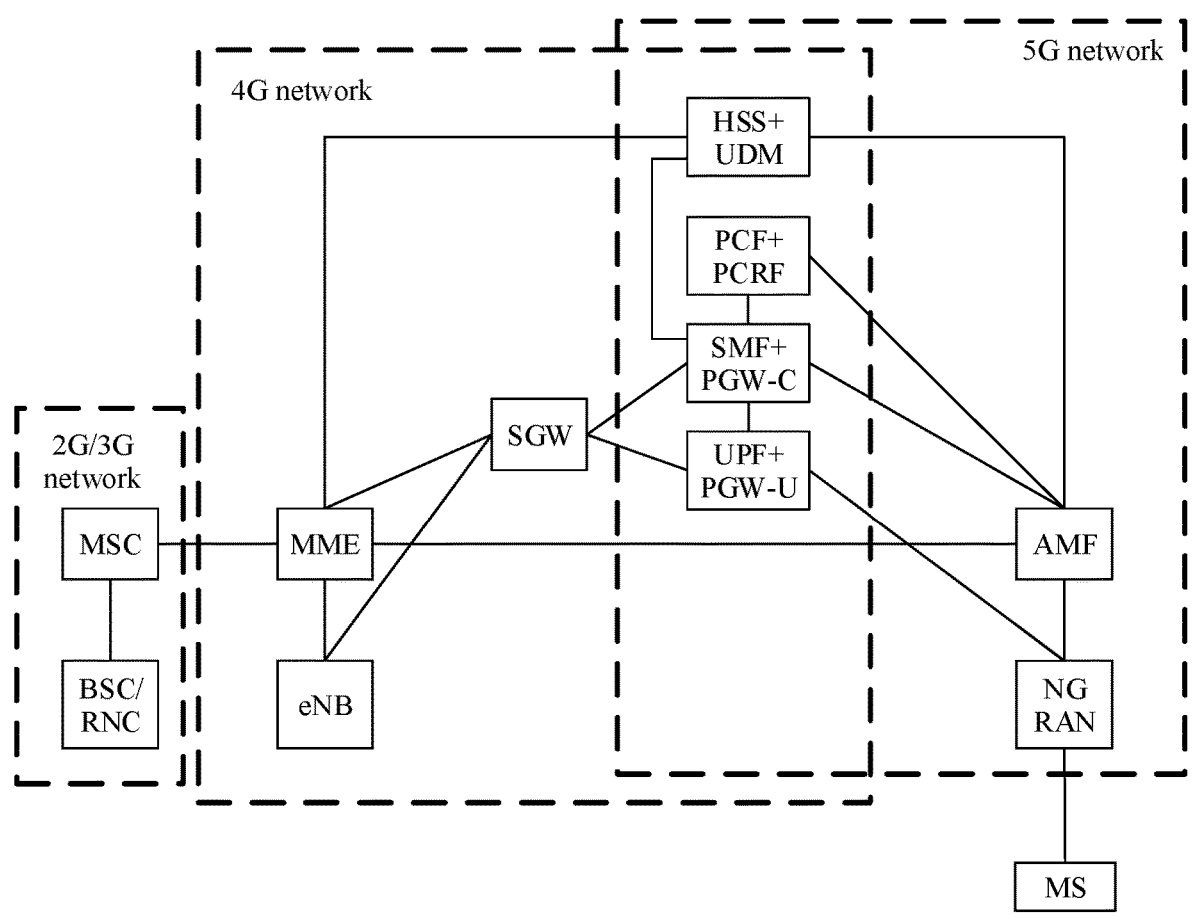
FIG. 1 is a schematic structural diagram of a wireless communications system according to an embodiment of this application.
Figure 2:
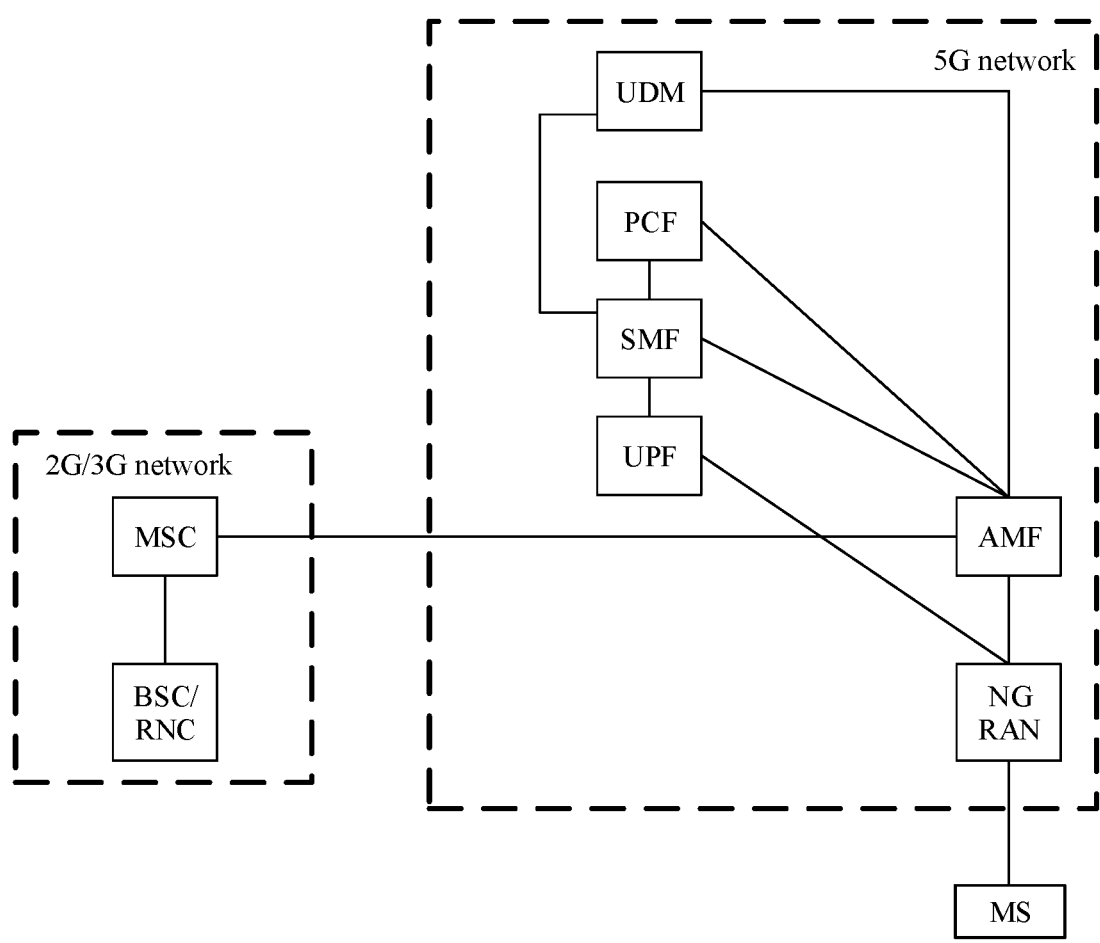
FIG. 2 is a schematic structural diagram of another wireless communications system according to an embodiment of this application.

To facilitate description of a method and an apparatus in the embodiments of this application, an example of a wireless communications system to which the embodiments of this application are applied is first described with reference to FIG. 1 and FIG. 2. It should be noted that FIG. 1 and FIG. 2 are examples for description. With development of wireless communications technologies, any network element may be replaced with one or more other network elements, and any network element may be deployed on one or more physical entities. This is not limited in the embodiments of this application.

The method provided in the embodiments of this application may be applied to a wireless communications system. The wireless communications system may include a first network and a second network. The first network and the second network may indirectly communicate with each other by using a third network, or the first network and the second network may directly communicate with each other. The following first describes an indirect communication mode.

A wireless communications system includes a first network, a second network, and a third network. The first network may include a 5G network or a future wireless communications network. The second network may include a network that supports a circuit switched (CS for short) domain, for example, include a 2G network or a 3G network. The third network may include an EPS network. The 2G network may include a global system for mobile communications (GSM for short) network, a code division multiple access (CDMA for short) network, or a general packet radio service (GPRS for short) network. The 3G network may include a CDMA2000 network, a wideband code division multiple access (WCDMA for short) network, a time division-synchronous code division multiple access (TD-SCDMA for short) network, or a universal mobile telecommunications system (UMTS for short) network.

As shown in FIG. 1, the 5G network includes a radio access network (RAN for short) device, an access and mobility management function (AMF for short) network element, a unified data management (UDM for short) network element, a policy control function (PCF for short)

network element, a session management function (SMF for short) network element, and a user plane function (UPF for short) network element. The RAN device may be a next-generation (NG for short) RAN device, or may be an evolved universal terrestrial radio access network (E-UTRAN for short) device.

As shown in FIG. 1, the EPS network includes an E-UTRAN device, a mobility management entity (MME for short) network element, a serving gateway (SGW for short), a packet data network gateway (PGW for short), a policy and charging rules function (PCRF for short) network element, and a home subscriber server (HSS for short). The E-UTRAN device may be an evolved NodeB (eNB for short). The packet data network gateway may include a packet data network gateway-control plane (PGW-C for short) network element and a packet data network gateway-user plane (PGW-U for short) network element. Some network elements in the 5G network and some network elements in the EPS network may be deployed on a same physical entity. For example, as shown in FIG. 1, an HSS+UDM network element indicates a same physical entity on which the HSS network element and the UDM network element are deployed, a PCF+PCRF network element indicates a same physical entity on which the PCF network element and the PCRF network element are deployed, SMF+PGW-C indicates a same physical entity on which the SMF network element and the PGW-C network element are deployed, and UPF+PGW-U indicates a same physical entity on which the UPF network element and the PGW-U network element are deployed. Therefore, network elements in the embodiments of this application may be the foregoing network elements deployed on a same physical entity, or may be separate network elements. This is not limited in the embodiments of this application.

As shown in FIG. 1, the 2G/3G network includes a mobile switching center (MSC for short) network element, a serving GPRS support node (SGSN for short), and a GPRS support node (GGSN for short), and further includes a base station controller (BSC for short) or a radio network controller (RNC for short).

As shown in FIG. 1, there is no interworking interface between the 5G network and the 2G/3G network, there is an interworking interface between the 5G network and the EPS network, and there is an interworking interface between the EPS network and the 2G/3G network. Therefore, the 5G network may indirectly communicate with the 2G/3G network by using the EPS network. Specifically, the AMF network element may communicate with the MME network element by using an N26 interface, and the MME network element may communicate with the MSC network element by using an Sv interface.

A direct communication mode is then described. A wireless communications system includes a first network and a second network. The first network may include an EPS network, a 5G network, and a future wireless communications network. The second network may include a network that supports a CS domain voice service, for example, a 2G network or a 3G network. The 2G network may include a GSM network, a CDMA network, or a GPRS network. The 3G network may include a CDMA2000 network, a WCDMA network, a TD-SCDMA network, or a UMTS network. As shown in FIG. 2, the first network includes a 5G network, and the second network includes a 2G/3G network. There is an interworking interface between the 5G network and the 2G/3G network. Therefore, the 5G network may directly communicate with the 2G/3G network. In an implementation, an AMF network element may communicate with an MSC network element by using an Sv interface. In another optional implementation, in addition to the 5G network, the first network further includes an EPS network, and a network element in the first network may be integrated with a function of a network element in the 5G network and a function of a network element in the EPS network. Specifically, an MME module is added to the AMF network element. The MME module includes an Sv interface function used to communicate with the MSC network element. The AMF network element may communicate with the MSC network element by using the MME module.

In the wireless communications systems shown in FIG. 1 and FIG. 2, the terminal device may also be referred to as user equipment ("UE" for short), an access terminal, a subscriber unit, a subscriber station, a mobile station, a mobile station, a remote station, a remote terminal, a mobile device, a user terminal, a terminal, a wireless communication device, a user agent, a user apparatus, or the like. The terminal device may be a station (ST for short) in a wireless local area network (WLAN for short), a cellular phone, a cordless phone, a session initiation protocol (SIP for short) phone, a wireless local loop (WALL for short) station, a personal digital assistant (PDA for short), a handheld device having a wireless communication function, a computing device, another processing device connected to a wireless modem, a vehicle-mounted device, or a wearable device (may also be referred to as a wearable intelligent device). Alternatively, the terminal device may be a terminal device in a next-generation communications system, for example, a terminal device in 5G, a terminal device in a future evolved public land mobile network (PLMN for short), or a terminal device in a new radio (NR for short) communications system.

In the wireless communications systems shown in FIG. 1 and FIG. 2, the AMF network element may be responsible for registration, mobility management, a tracking area update procedure, and the like of the terminal device. The AMF network element may also be referred to as an AMF device or an AMF entity.

In the wireless communications systems shown in FIG. 1 and FIG. 2, the SMF network element may be responsible for session management of the terminal device. For example, the session management includes user plane device selection, user plane device reselection, IP address allocation, quality of service (QoS) control, and session establishment, modification, or release. The SMF network element may also be referred to as an SMF entity or an SMF device.

In the wireless communications systems shown in FIG. 1 and FIG. 2, the PCF network element includes functions of policy control and flow-based charging control. For example, the PCF network element may implement a policy control function, a charging policy control function, and QoS control. The PCF network element may also be referred to as a PCF entity or a PCF device.

In the wireless communications system shown in FIG. 1, the MME network element may be responsible for authentication, mobility management, and session management of the terminal device. The MME network element may also be referred to as an MME device or an MME entity.

Each of the foregoing network elements may be a network element implemented on dedicated hardware, or may be a software instance running on dedicated hardware, or may be a virtualized function instance on an appropriate platform. For example, the virtualization platform may be a cloud platform.

Relatively mature voice service solutions include an internet protocol multimedia subsystem (IMS for short) voice service solution in an EPS network and a circuit switched (CS) voice service solution in a 2G/3G network. The embodiments of this application provide a voice service establishment method. When a terminal device is located in a 5G network, and neither establishment of an IMS voice service in the 5G network nor establishment of an IMS voice service in the EPS network is supported, the terminal device is handed over from the 5G network to the 2G/3G network, to establish a CS domain voice service of the terminal device.

The following describes the voice service establishment method in the embodiments of this application.

In description of this application, "/" means "or" unless otherwise specified. For example, AB may represent A or B. In this application, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two.

Figure 3:
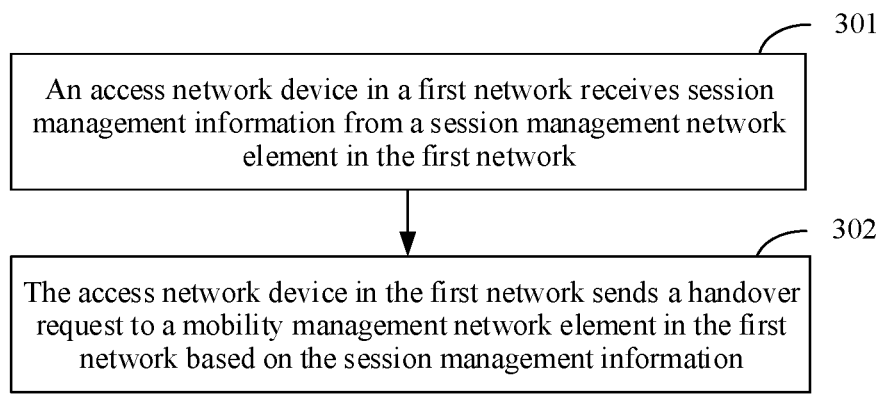
FIG. 3 is a schematic flowchart of a method embodiment according to an embodiment of this application.

Referring to FIG. 3, an embodiment of this application provides a method embodiment of a voice service establishment method. This embodiment may be applied to the wireless communications system shown in FIG. 1 or FIG. 2.

301. An access network device in a first network receives session management (SM for short) information from a session management network element in the first network. The SM information is used to request to establish a user plane tunnel of a voice service of a terminal device in the first network.

For example, when the terminal device is located in the first network, and the voice service of the terminal device needs to be established, the access network device in the first network receives the SM information from the session management network element in the first network. The SM information may be sent by the session management network element in the first network to a mobility management network element in the first network, and the mobility management network element in the first network sends the SM information to the access network device in the first network. The SM information may be carried in a message direct transfer request (for example, an Namf-communication-N1N2messagetransfer request). The voice service of the terminal device may be a calling voice service of the terminal device, namely, a voice service actively initiated by the terminal device, or may be a called voice service of the terminal device, namely, a voice service passively initiated by the terminal device.

The wireless communications systems shown in FIG. 1 and FIG. 2 are used as examples for description below. The first network may be a 5G network, the mobility management network element in the first network may be an AMF network element, the access network device in the first network may be an RAN device, for example, may be an NG-RAN device, and the session management network element in the first network may be an SMF network element. When the terminal device is located in the 5G network, and an IMS voice service of the terminal device needs to be established, the SMF network element sends a message direct transfer request (for example, an Namf-communication-N1N2messagetransfer request) to the AMF network element. The request includes the SM information. The AMF network element sends an N2 session request to the NG-RAN device based on the received message direct transfer request, where the N2 session request carries the SM information, so that the NG-RAN device allocates a corresponding radio resource to a user plane tunnel in the 5G network based on the SM information. The user plane tunnel in the 5G network usually refers to a QoS flow for transmitting user plane data. A 5G QoS indicator (also referred to as 5QI below) of a user plane tunnel in the 5G network corresponding to the IMS voice service of the terminal device may be equal to 1, or may be another value. In this embodiment of this application, the method provided in this embodiment of this application is described by using an example in which the 5QI of the user plane tunnel corresponding to the IMS voice service is equal to 1.

The SM information may be SM information of an N2 interface related to the user plane tunnel of the IMS voice service of the terminal device. The SM information may include a QoS parameter of the user plane tunnel corresponding to the IMS voice service of the terminal device, for example, the 5QI that is equal to 1, an allocation/retention priority (A/RP for short), a guaranteed flow bit rate (GFBR for short), and a maximum flow bit rate (MFBR for short).

302. The access network device in the first network sends a handover request to the mobility management network element in the first network based on the session management information. The handover request is used to indicate a handover of the terminal device from the first network to a second network.

The second network supports a CS domain voice service. For example, the second network may be a 2G or 3G network. In an embodiment, the handover request may be used to indicate a handover of the voice service of the terminal device from the first network to the second network. In addition, the handover from the first network to the second network may be an SRVCC handover from the first network to the second network.

In an embodiment, the handover request includes at least one of a first voice handover identifier for handover from the first network to the second network and a target identifier (ID) of the second network. Description is separately provided below. The first voice handover identifier is used to indicate the handover of the voice service of the terminal device from the first network to the second network, and may be an SRVCC handover indication (HO indication). The first voice handover identifier may be generated by the access network device in the first network. The target identifier of the second network is used to identify the second network to which the terminal device needs to be handed over, and may include a base station identifier of the second network, for example, a target RNC/BSC identifier, or may include a target cell ID of the second network. The target identifier may be obtained by the access network device in the first network based on a signal measurement report.

After receiving the handover request, the mobility management network element in the first network may indirectly communicate with a mobile switching network element in the second network by using a third network, to implement the handover of the terminal device from the first network to the second network. The wireless communications system shown in FIG. 1 is used as an example. The NG-RAN device sends the handover request to the AMF network element, and adds the SRVCC handover indication, a target identifier of the 2G/3G network, or both the SRVCC handover indication and a target identifier of the 2G/3G network to the handover request, to trigger a handover of the voice service of the terminal device from the 5G network to the 2G/3G network. After receiving the handover request, the AMF network element generates the SRVCC handover indication, adds the generated SRVCC handover indication and/or the target identifier of the second network to a relocation request message, and sends the relocation request message to an MME network element. The MME network element obtains at least one of the SRVCC handover indication and the target identifier of the second network from the received relocation request message, determines the handover of the voice service of the terminal device from the 5G network to the 2G/3G network based on the at least one of the SRVCC handover indication and the target identifier of the second network, and sends a packet-switched to circuit-switched request to an MSC network element. The MSC network element hands over the voice service of the terminal device to the 2G/3G network based on the packet-switched to circuit-switched request.

After receiving the handover request, the mobility management network element in the first network may directly communicate with a mobile switching network element in the second network, to implement the handover of the terminal device from the first network to the second network. The wireless communications system shown in FIG. 2 is used as an example. The NG-RAN device sends the handover request to the AMF network element, and adds the SRVCC handover indication, a target identifier of the 2G/3G network, or both the SRVCC handover indication and a target identifier of the 2G/3G network to the handover request, to trigger a handover of the voice service of the terminal device from the 5G network to the 2G/3G network. After receiving the handover request, the AMF network element determines the handover of the voice service of the terminal device from the 5G network to the 2G/3G network based on at least one of the SRVCC handover indication and the target identifier of the second network, and sends a packet-switched to circuit-switched request to an MSC network element. The MSC network element hands over the voice service of the terminal device to the 2G/3G network based on the packet-switched to circuit-switched request.

It may be learned from the foregoing technical solution that when the access network device in the first network receives the SM information used to request to establish the user plane tunnel of the voice service of the terminal device in the first network, the access network device in the first network sends the handover request to the mobility management network element in the first network based on the SM information, where the handover request is used to indicate the handover of the terminal device from the first network to the second network, to establish a CS domain voice service of the terminal device in the second network.

When the terminal device is located in the 5G network, and the voice service of the terminal device cannot be established in the 5G network or in an EPS network, the terminal device cannot camp on the 5G network based on a current 5G network protocol, and consequently cannot enjoy a high-speed data service. According to the method provided in this embodiment of this application, the NG-RAN device may send the handover request to the AMF network element, so that the terminal device in the 5G network is handed over from the 5G network to the 2G/3G network, and the CS domain voice service of the terminal device can be established in the 2G/3G network. In this way, the terminal device may first camp on the 5G network to enjoy a high-speed data service, and when a voice service needs to be established, is handed over to the 2G/3G network to establish the CS domain voice service.

Figure 4A:
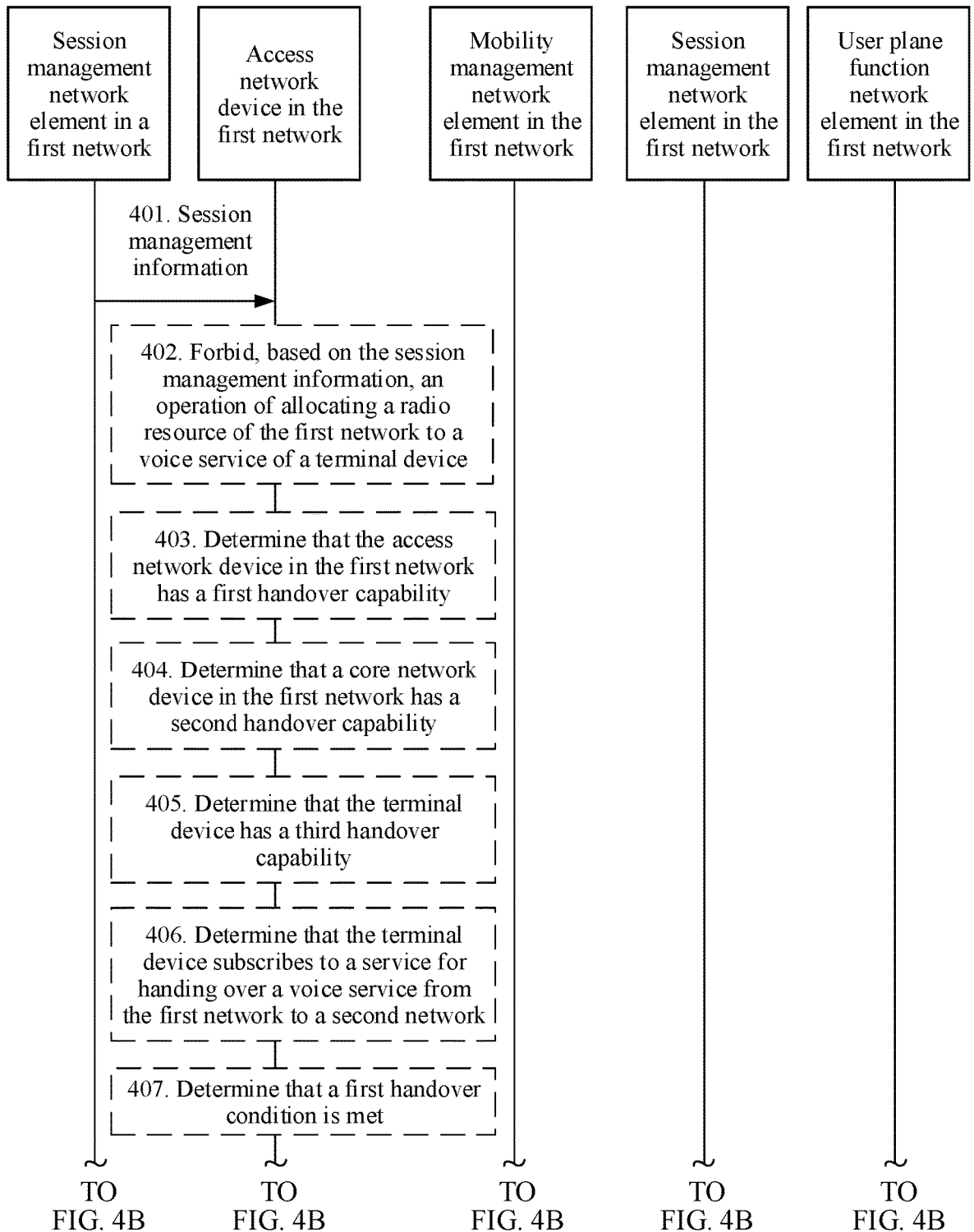
FIG. 4A and FIG. 4B are schematic flowcharts of another method embodiment according to an embodiment of this application.
Figure 4B:
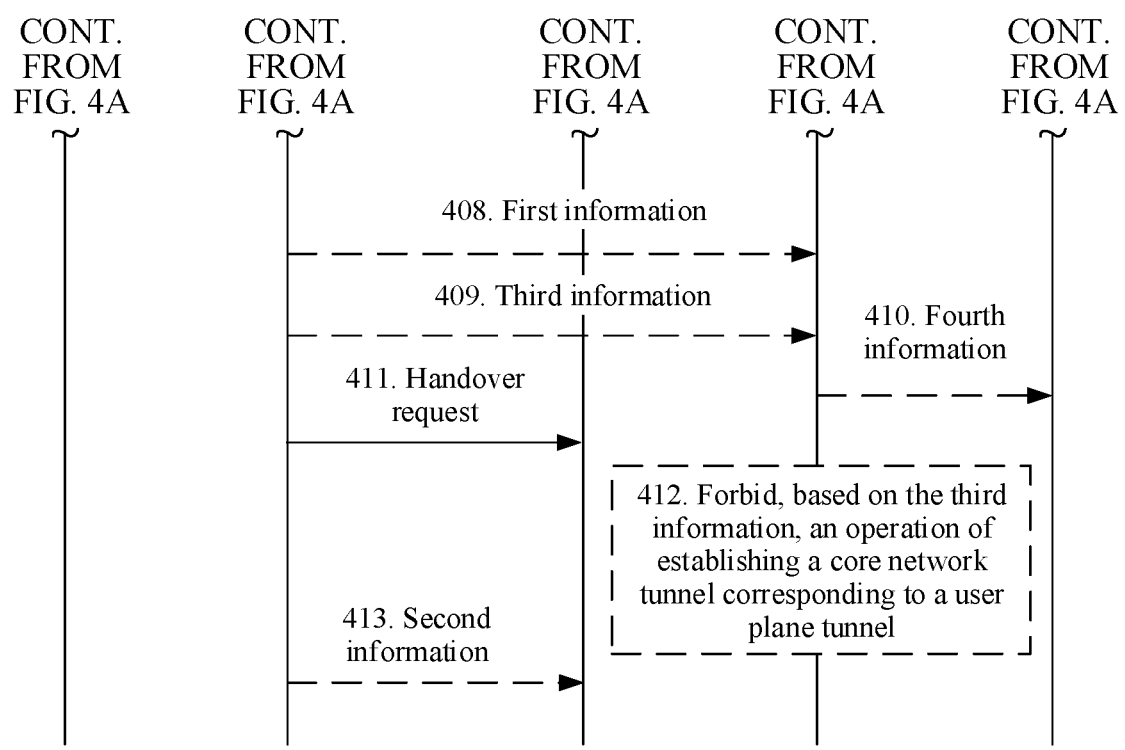

FIG. 4A and FIG. 4B are schematic flowcharts of another method embodiment of a voice service establishment method according to an embodiment of this application. FIG. 4A and FIG. 4B are described with reference to FIG. 3. As shown in FIG. 4A and FIG. 4B, the method may include the following operations.

401. An access network device in a first network receives session management information from a session management network element in the first network. The session management information is used to request to establish a user plane tunnel of a voice service of a terminal device in the first network.

For operation 401, refer to the description of operation 301 in FIG. 3. Details are not described herein again.

411. The access network device in the first network sends a handover request to a mobility management network element in the first network based on the session management information. The handover request is used to indicate a handover of the terminal device from the first network to a second network.

For operation 411, refer to the description of operation 302 in FIG. 3. Details are not described herein again.

In an embodiment of this application, the access network device in the first network triggers the handover of the terminal device from the first network to the second network based on the SM information, and therefore no voice service of the terminal device is established in the first network. Therefore, to save a radio resource of the first network, in an embodiment, the method in this embodiment further includes the following operation:

402. The access network device in the first network forbids, based on the SM information, an operation of allocating a radio resource of the first network to the voice service of the terminal device. For example, the access network device in the first network forbids allocating the radio resource of the first network to the user plane tunnel of the voice service of the terminal device.

In an embodiment of this application, before sending the handover request, the access network device in the first network may further determine one or more of the following conditions: a capability of the access network device in the first network, a capability of a core network device in the first network, a capability of the terminal device, a subscription status of the terminal device, or a current network environment. Description is separately provided below.

In an embodiment, before sending the handover request, the access network device in the first network determines the capability of the access network device in the first network.

In an embodiment, the method further includes: 403. The access network device in the first network determines that the access network device in the first network has a first handover capability. The first handover capability includes a capability of triggering the handover of the terminal device from the first network to the second network.

In an embodiment, the first handover capability may include a capability of triggering a handover of the voice service of the terminal device from the first network to the second network. For example, the handover from the first network to the second network may be an SRVCC handover from the first network to the second network. In an embodiment, the first handover capability may include a capability of triggering the handover of the terminal device from the first network to the second network based on the SM information. The access network device in the first network may determine, based on network configuration information of the access network device in the first network, whether the access network device in the first network has the foregoing capability.

For example, before sending the handover request to an AMF network element, an NG-RAN device determines whether the NG-RAN device supports interworking with a 2G/3G network, that is, whether the NG-RAN device has a capability of triggering an SRVCC handover of the terminal device from a 5G network to the 2G/3G network. If the NG-RAN device has the capability, the NG-RAN device sends the handover request to the AMF network element. If the NG-RAN device does not have the capability, the NG-RAN device does not send the handover request to the AMF network element. Further, the NG-RAN device determines whether the NG-RAN device has a capability of triggering the SRVCC handover of the terminal device from the 5G network to the 2G/3G network based on the SM information. If the NG-RAN device has the capability, the NG-RAN device sends the handover request to the AMF network element. If the NG-RAN device does not have the capability, the NG-RAN device does not send the handover request to the AMF network element. The NR-RAN device may determine, based on network configuration information of the NR-RAN device, whether the NR-RAN device has the foregoing capability.

In an embodiment, before sending the handover request, the access network device in the first network determines the capability of the core network device in the first network.

In an embodiment, the method further includes: 404. The access network device in the first network determines that the core network device in the first network has a second handover capability. The second handover capability includes a capability of supporting the handover of the terminal device from the first network to the second network. The core network device in the first network includes one or more of the following network elements: the mobility management network element in the first network, the session management network element in the first network, and a user plane function network element in the first network. For example, a core network device in the 5G network includes one or more of the AMF network element, an SMF network element, and a UPF network element.

In an embodiment, the second handover capability includes a capability of supporting the handover of the voice service of the terminal device from the first network to the second network. For example, the handover from the first network to the second network may be an SRVCC handover from the first network to the second network. The access network device in the first network may determine, based on the network configuration information of the access network device in the first network, whether the core network device in the first network has the foregoing capability. Alternatively, the core network device in the first network may send information about whether the core network device in the first network has the foregoing capability to the access network device in the first network.

For example, before sending the handover request to the AMF network element, the NG-RAN device determines whether the core network device (for example, the AMF network element) in the 5G network supports interworking with the 2G/3G network, that is, whether the AMF network element has a capability of supporting the SRVCC handover of the terminal device from the 5G network to the 2G/3G network. If the AMF network element has the capability, the NG-RAN device sends the handover request to the AMF network element. If the AMF network element does not have the capability, the NG-RAN device does not send the handover request to the AMF network element. The NG-RAN device may determine, based on the network configuration information of the NR-RAN device, whether the core network device in the 5G network has the foregoing capability. Alternatively, the core network device in the 5G network may send information about whether the core network device has the foregoing capability to the NG-RAN device. For example, the AMF network element sends an SRVCC operation possible information element to the NG-RAN device by using an N2 interface message. The information element may be used to indicate whether the AMF network element has the capability of supporting the SRVCC handover of the terminal device from the 5G network to the 2G/3G network.

In an embodiment, before sending the handover request, the access network device in the first network determines the capability of the terminal device.

In an embodiment, the method further includes: 405. The access network device in the first network determines that the terminal device has a third handover capability. The third handover capability includes a capability of supporting a handover from an IMS voice service to a CS domain voice service. For example, the third handover capability may include at least one of a capability of supporting the handover from the IMS voice service to the CS domain voice service before alerting and a capability of supporting the handover from the IMS voice service to the CS domain voice service during alerting. The access network device in the first network may learn, based on air interface-side capability information reported by the terminal device, whether the terminal device has the foregoing capability. Alternatively, the mobility management network element in the first network may send information about whether the terminal device has the foregoing capability to the access network device in the first network.

For example, before sending the handover request to the AMF network element, the NG-RAN device determines whether the terminal device has the capability of supporting the handover from the IMS voice service to the CS domain voice service. The capability may include at least one of a capability of supporting an SRVCC handover before alerting and a capability of supporting an SRVCC handover during alerting. If the terminal device has the capability, the NG-RAN device sends the handover request to the AMF network element. If the terminal device does not have the capability, the NG-RAN device does not send the handover request to the AMF network element. The NG-RAN device may determine, based on the air interface-side capability information reported by the terminal device, whether the terminal device has the foregoing capability. Alternatively, the AMF network element may send an SRVCC operation possible information element to the NG-RAN device by using an N2 interface message. The information element may be used to indicate whether the terminal device has the capability of supporting the SRVCC handover.

In an embodiment, before sending the handover request, the access network device in the first network determines the subscription status of the terminal device.

In an embodiment, the method further includes: 406. The access network device in the first network determines that the terminal device subscribes to a service for handing over a voice service from the first network to the second network. For example, the access network device in the first network may learn, from the mobility management network element in the first network, whether the terminal device subscribes to the service.

For example, before sending the handover request to the AMF network element, the NG-RAN device determines whether the terminal device subscribes to the service for handing over the voice service from the first network to the second network. If the terminal device subscribes to the service for handing over the voice service from the first network to the second network, the NG-RAN device sends the handover request to the AMF network element. If the terminal device does not subscribe to the service for handing over the voice service from the first network to the second network, the NG-RAN device does not send the handover request to the AMF network element. The NG-RAN device may receive an SRVCC operation possible information element from the AMF by using an N2 interface. The information element may be used to indicate whether the terminal device subscribes to the service for handing over the voice service from the first network to the second network. The AMF network element may set the SRVCC operation possible information element based on subscription information of the terminal device that is obtained from a UDM/HSS network element. For example, the subscription information may include at least one of a correlation-mobile station integrated services digital network (C-MSISDN for short) and a session transfer number for SRVCC (session transfer number for SRVCC, STN-SR for short).

In an embodiment, before sending the handover request, the access network device in the first network determines the current network environment.

In an embodiment, as shown in FIG. 4A and FIG. 4B, the method further includes: 407. The access network device in the first network determines that a first handover condition is met. The first handover condition includes one or more of the following conditions: The terminal device is located in a voice service coverage area of the second network, the voice service of the terminal device cannot be implemented in the first network, the voice service of the terminal device cannot be implemented in a third network, and the terminal device is a voice-centric (voice centric) device. The third network is an intermediate-state evolved network between the second network and the first network. For example, when the second network is the 2G/3G network, and the first network is the 5G network, the third network is an intermediate-state evolved network between the 2G/3G network and the 5G network, for example, may be an EPS network. The following describes each of the foregoing conditions by using an example in which the first network is the 5G network, the second network is the 2G/3G network, and the third network is the EPS network.

For example, that the terminal device is located in a voice service coverage area of the 2G/3G network includes: An operator deploys the 2G/3G network. Further, in an embodiment, that the terminal device is located in a voice service coverage area of the 2G/3G network further includes: A current location of the terminal device is within a signal coverage area of the 2G/3G network. Further, in an embodiment, that the terminal device is located in a voice service coverage area of the 2G/3G network further includes: A signal coverage status of the 2G/3G network at the current location of the terminal device meets a requirement of a CS domain voice service. For example, if the operator deploys the 2G/3G network at the current location of the terminal device, the current location of the terminal device is within the signal coverage area of the 2G/3G network, and the signal coverage status of the 2G/3G network meets the requirement of the CS domain voice service, it may be determined that the terminal device is located in the voice service coverage area of the 2G/3G network. For example, the NG-RAN device may determine, based on the network configuration information of the NG-RAN device, that the operator deploys the 2G/3G network at the current location of the terminal device. The NG-RAN device may determine, based on a signal measurement report of the 2G/3G network that is obtained by the terminal device, that the current location of the terminal device is within the signal coverage area of the 2G/3G network and the signal coverage status at the current location of the terminal device meets the requirement of the CS domain voice service.

For example, that the voice service of the terminal device cannot be implemented in the 5G network may include: The operator does not deploy an IMS voice service in the 5G network. Further, in an embodiment, that the voice service of the terminal device cannot be implemented in the 5G network further includes: A signal coverage status of the 5G network at the current location of the terminal device fails to meet a requirement of the IMS voice service. For example, if the operator does not deploy the IMS voice service in the 5G network or the signal coverage status of the 5G network at the current location of the terminal device cannot meet the requirement of the IMS domain voice service (for example, specifically, a coverage area of a high-frequency signal is relatively small, or the terminal device is located outside a signal coverage area, of the 5G network, at which the requirement of the IMS voice service can be met), it may be determined that the voice service of the terminal device cannot be implemented in the 5G network. The NG-RAN device may determine, based on the network configuration information of the NG-RAN device, that the operator does not deploy the IMS voice service in the 5G network. The NG-RAN device may determine, based on a signal measurement report of the 5G network that is obtained by the terminal device, that the signal coverage status of the 5G network at the current location of the terminal device cannot meet the requirement of the IMS voice service.

For example, that the voice service of the terminal device cannot be implemented in the EPS network includes: The operator does not deploy the EPS network. Further, in an embodiment, that the voice service of the terminal device cannot be implemented in the EPS network further includes: No IMS voice service is deployed in the EPS network. Further, in an embodiment, that the voice service of the terminal device cannot be implemented in the EPS network further includes: A signal coverage status of the EPS network at the current location of the terminal device fails to meet a requirement of an IMS voice service. For example, if the operator does not deploy the EPS network, no IMS voice service is deployed in the EPS network, or the signal coverage status of the EPS network at the current location of the terminal device cannot meet the requirement of the IMS domain voice service, it may be determined that the voice service of the terminal device cannot be implemented in the EPS network. The NG-RAN device may determine, based on the network configuration information of the NG-RAN device, that the operator does not deploy the EPS network. The NG-RAN device may determine, based on the network configuration information of the NG-RAN device, that the operator does not deploy the IMS voice service in the EPS network. The NG-RAN device may determine, based on a signal measurement report of the EPS network that is obtained by the terminal device, that the signal coverage status of the EPS network at the current location of the terminal device cannot meet the requirement of the IMS voice service.

For example, the NG-RAN device may determine, based on air interface-side device information reported by the terminal device, that the terminal device is a voice-centric device. For example, the air interface-side device information includes information used to indicate that the terminal device is a voice-centric device. Alternatively, the NG-RAN device may learn, from the AMF network element, that the terminal device is a voice service-centric device. For example, the AMF network element receives a registration request from the terminal device. The registration request includes information used to indicate that the terminal device is a voice-centric device. Therefore, the AMF network element learns that the terminal device is a voice service-centric device. Then, the AMF network element notifies, by using the N2 interface, the NG-RAN device that the terminal device is a voice service-centric device.

It should be noted that before sending the handover request, the access network device in the first network may determine any one or more of the following information: the capability of the access network device in the first network, the capability of the core network device in the first network, the capability and the subscription status of the terminal device, and the first handover condition. This is not limited in this embodiment of this application.

In an embodiment, the method further includes: 408. The access network device in the first network sends first information to the session management network element in the first network. Correspondingly, the session management network element in the first network receives the first information from the access network device in the first network. The first information is used to notify the session management network element in the first network of the handover of the terminal device from the first network to the second network. Further, in an embodiment, the first information is used to notify the session management network element in the first network of the handover of the voice service of the terminal device from the first network to the second network.

In an embodiment, the method further includes: 409. After receiving the SM information from the session management network element in the first network, the access network device in the first network sends third information to the session management network element in the first network. Correspondingly, the session management network element in the first network receives the third information from the access network device in the first network. The third information is used to indicate that establishment of the user plane tunnel of the voice service of the terminal device in the first network is accepted or rejected.

It should be noted that a sequence of performing operations 402 to 409 is not limited in this embodiment of this application. In addition, a sequence of performing operations 408, 409, and 411 is not limited either.

In an embodiment, the method further includes: 410. The session management network element in the first network sends fourth information to the user plane function network element in the first network based on the third information. Correspondingly, the user plane function network element in the first network receives the fourth information from the session management network element in the first network. The fourth information is used to instruct the user plane function network element in the first network to stop forwarding a data packet of the voice service of the terminal device. After receiving the fourth information, the user plane function network element in the first network stops, based on the fourth information, forwarding the data packet of the voice service of the terminal device. The data packet of the voice service of the terminal device may include at least one of an uplink data packet of the voice service of the terminal device and a downlink data packet of the voice service of the terminal device. The third information may be transparently transmitted to the session management network element in the first network by using the mobility management network element in the first network.

Therefore, the session management network element in the first network can determine, by using the third information, that the terminal device is handed over from the first network to the second network and a voice service is established in the second network. Therefore, no voice service needs to be established in the first network. The session management network element in the first network sends the fourth information to the user plane function network element, so that the user plane function network element stops forwarding the data packet of the voice service of the terminal device. In this way, a network device and the terminal device in the first network are prevented from performing unnecessary operations, to save network resources.

After receiving the third information, the session management network element in the first network can determine, based on the third information, that establishment of the user plane tunnel of the voice service of the terminal device in the first network is accepted or rejected. Further, the session management network element in the first network may determine, based on network configuration information of the session management network element in the first network or the first information, that the handover from the first network to the second network needs to be performed and no voice service needs to be established in the first network, and therefore further determines that the fourth information needs to be sent, so that the user plane function network element in the first network stops forwarding the data packet of the voice service of the terminal device. In an embodiment, the session management network element in the first network sends the fourth information to the user plane function network element in the first network based on the network configuration information and the third information, or sends the fourth information to the user plane function network element in the first network based on the first information and the third information.

For example, after receiving the SM information, the NG-RAN device sends an N2 session response to the AMF network element. The N2 session response includes the third information, and the third information is used to indicate that establishment of the user plane tunnel of the voice service of the terminal device in the 5G network is accepted or rejected. The AMF network element sends a session management context update request message (for example, an Nsmf-PDU Session-Update SM Context Request message) to the SMF network element based on the received N2 session response. The third information is transparently transmitted in the session management context update request message. After receiving the third information, the SMF network element determines, based on network configuration information of the SMF network element or the first information sent by the NG-RAN device, that the handover from the 5G network to the 2G/3G network needs to be performed and no voice service needs to be established in the 5G network. The SMF network element sends an N4 session modification request to the UPF network element. The N4 session modification request carries the fourth information, and the fourth information is used to instruct the UPF network element to stop forwarding the data packet of the voice service of the terminal device. The UPF network element stops, based on the received fourth information, forwarding the data packet of the voice service of the terminal device. It may be learned that the UPF network element is instructed to stop forwarding the data packet of the voice service of the terminal device, so that the UPF network element and the terminal device can be prevented from processing unnecessary signaling, to save network resources. Specifically, the UPF network element stops forwarding a data packet transmitted in a QoS flow whose quality of service flow identity (QFI for short) or 5QI is equal to 5.

In an embodiment, the method further includes: 412. The session management network element in the first network forbids, based on the third information, an operation of establishing a core network tunnel corresponding to the user plane tunnel. In this way, the network device and the terminal device in the first network are prevented from performing unnecessary operations, to save network resources. The session management network element in the first network may forbid, in a plurality of manners, the operation of establishing the core network tunnel corresponding to the user plane tunnel. Details are described below.

For example, in an implementation, after receiving the third information, the session management network element in the first network may forbid sending fifth information to the user plane function network element in the first network. The fifth information is used to instruct the user plane function network element in the first network to establish the corresponding core network tunnel for the user plane tunnel. Sending of the fifth information is forbidden, so that the operation of establishing the core network tunnel by the user plane function network element in the first network can be forbidden.

In another embodiment, the session management network element in the first network sends sixth information to the user plane function network element in the first network. The sixth information is used to instruct to forbid the user plane function network element in the first network to establish the corresponding core network tunnel for the user plane tunnel.

After receiving the third information, the session management network element in the first network can determine, based on the third information, that establishment of the user plane tunnel of the voice service of the terminal device in the first network is accepted or rejected. Further, the session management network element in the first network may determine, based on the network configuration information of the session management network element in the first network or the first information, that the handover from the first network to the second network needs to be performed and no voice service needs to be established in the first network, and therefore forbids the operation of establishing the core network tunnel corresponding to the user plane tunnel, so that the user plane function network element in the first network does not establish the corresponding core network tunnel. In an embodiment, the session management network element in the first network forbids, based on the network configuration information and the third information, the operation of establishing the core network tunnel, or forbids, based on the first information and the third information, the operation of establishing the core network tunnel.

For example, after receiving the SM information, the NG-RAN device sends an N2 session response to the AMF network element. The N2 session response includes the third information, and the third information is used to indicate that establishment of the user plane tunnel of the voice service of the terminal device in the 5G network is accepted or rejected. The AMF network element sends a session management context update request message (for example, an Nsmf-PDU Session-Update SM Context Request message) to the SMF network element based on the received N2 session response. The third information is transparently transmitted in the session management context update request message. After receiving the third information, the SMF network element determines, based on the network configuration information of the SMF network element or the first information sent by the NG-RAN device, that the handover from the 5G network to the 2G/3G network needs to be performed and no voice service needs to be established in the 5G network, and forbids sending, to the UPF network element, an N4 session modification request that carries the fifth information, or sends the sixth information to the UPF network element. The sixth information is used to instruct to forbid the UPF network element to establish the corresponding core network tunnel for the user plane tunnel. If receiving the sixth information, the UPF network element is forbidden, based on the sixth information, to establish the corresponding core network tunnel for the user plane tunnel. It may be learned that establishment of the corresponding core network tunnel for the user plane tunnel is forbidden, so that the UPF network element and the terminal device can be prevented from processing unnecessary signaling, to save network resources.

In an embodiment of this application, after the terminal device is handed over from the first network to the second network to establish a voice service in the second network, the terminal device may be immediately returned to the first network after the voice service in the second network ends. Details are described below.

In an embodiment, the method further includes: 413. The access network device in the first network sends second information to the mobility management network element in the first network. Correspondingly, the mobility management network element in the first network receives the second information from the access network device in the first network. The second information is used to indicate returning of the terminal device from the second network to the first network after the voice service in the second network ends. The second information may be carried in the handover request, or may be carried in other information for sending. In addition, the second information may directly indicate returning of the terminal device from the second network to the first network after the voice service in the second network ends. The second information may alternatively be voice fallback indication information used to indicate fallback of the voice service from the first network to the second network. The fallback is indicated to indicate returning of the terminal device from the second network to the first network after the voice service in the second network ends. After receiving the second information, the mobility management network element in the first network sends the second information to a mobile switching network element in the second network. The mobility management network element in the first network may directly send the second information by using an interface between the mobility management network element in the first network and the mobile switching network element in the second network, or may indirectly send the second information by using a mobility management network element in the third network. For example, the mobility management network element in the first network sends the second information to the mobility management network element in the third network, and the mobility management network element in the third network sends the second information to the mobile switching network element in the second network. After receiving the second information, the mobile switching network element in the second network sends seventh information to a base station controller in the second network based on the second information. The seventh information is used to instruct the base station controller in the second network to trigger returning of the terminal device to the first network after the voice service in the second network ends. The seventh information may include at least one of the second information and network identifier information. The network identifier information is used to indicate that the terminal device comes from the first network. For example, the network identifier information may be a last 5G public land mobile network identity (PLMN ID for short). The base station controller in the second network immediately returns the terminal device from the second network to the first network based on at least one of the received second information and network identifier information after the voice service in the second network ends (the base station controller in the second network determines that the voice service in the second network ends or an MSC network element notifies the base station controller in the second network that the voice service in the second network ends).

For example, the handover request sent by the NG-RAN device to the AMF network element carries the second information. The second information is used to indicate returning of the terminal device from the 2G/3G network to the 5G network after a voice service in the 2G/3G network ends. The AMF network element directly sends the second information to the MSC network element, or sends the second information to the MSC network element by using an MME network element. After receiving the second information, the MSC network element sends at least one of the second information and the last PLMN ID to an RNC network element/BSC network element. The RNC/BSC network element returns the terminal device to the 5G network based on the at least one of the second information and the last PLMN ID after the voice service in the 2G/3G network ends. The 5G network to which the terminal device is returned may be a 5G network corresponding to the last PLMN ID. For example, the RNC/BSC network element immediately sends a radio resource control (RRC for short) connection release message to the terminal device, and adds redirection information to the RRC connection release message. The redirection information is used to instruct the terminal device to access the 5G network corresponding to the last 5G PLMN ID. For another example, the RNC/BSC network element triggers a handover procedure to hand over the terminal device to the 5G network corresponding to the last 5G PLMN ID.

For example, the base station controller in the second network may send the seventh information by using a handover request message, a radio resource setup message, or a radio resource release message. For example, in a voice service handover preparation phase, a handover request message sent by the MSC network element to the RNC/BSC network element may carry at least one of the second information and the last 5G PLMN ID. For another example, when the terminal device accesses a target 2G/3G cell and an RRC connection and an Iu/B interface connection are established, the MSC network element sends at least one of the second information and the last 5G PLMN ID to the RNC/BSC network element by using an Iu/B interface. For another example, after the voice service ends, when the MSC network element triggers release of an RRC connection and an Iu/B interface connection, the MSC network element sends at least one of the second information and the last 5G PLMN ID to the RNC/BSC network element.

The following separately describes, by using examples, processes of establishing a calling voice service and a called voice service of the terminal device. The process of establishing a calling voice service of the terminal device is first described.

Figure 5:
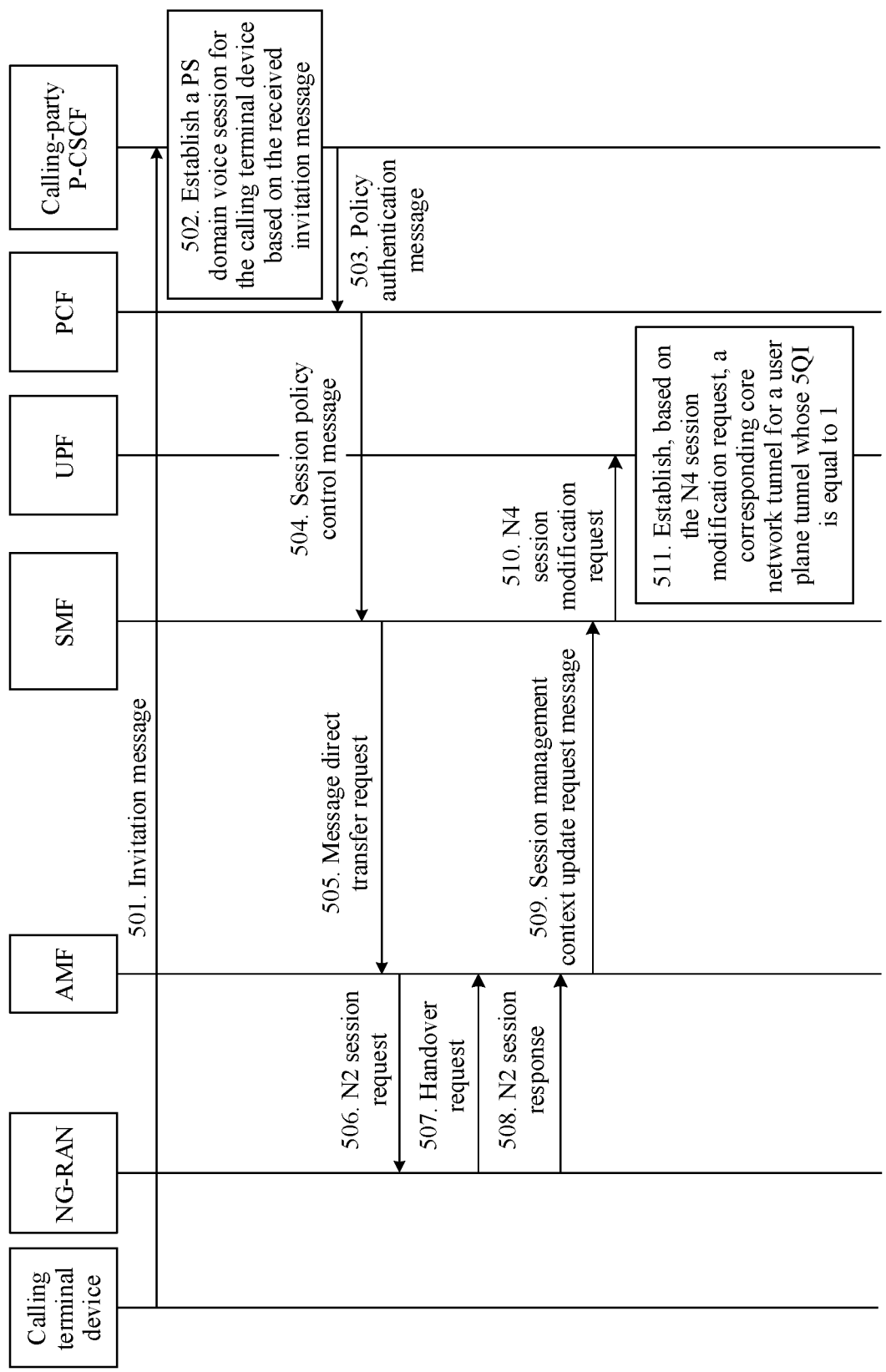
FIG. 5 is a schematic flowchart of another method embodiment according to an embodiment of this application.

Referring to FIG. 5, an embodiment of this application provides a method embodiment of a calling voice service establishment method. This embodiment may be applied to the wireless communications system shown in FIG. 1 or FIG. 2.

It should be noted that a 5G network in a wireless communications system in this embodiment may be based on a service-based interface or a point-to-point interface. This is not limited in this embodiment of this application.

501. A calling terminal device sends an invitation message to a calling-party proxy-call session control function (P-CSCF for short) device. Correspondingly, the calling-party P-CSCF device receives the invitation message from the calling terminal device.

The invitation message is used to request to establish a calling PS domain voice service for the calling terminal device in the 5G network, and the PS domain voice service may be an IMS voice service.

502. The calling-party P-CSCF device establishes a PS domain voice session for the calling terminal device based on the received invitation message.

The calling-party P-CSCF device in a calling IMS network may further send the invitation message to another node in the calling IMS network, for example, a serving-call session control function (S-CSCF for short) device and a telephony application server (TAS for short). The another node in the calling IMS network processes the received invitation message, so that a called terminal device may receive the invitation message that is sent by the calling terminal device and that is forwarded by the calling IMS network and a called IMS network.

503. The calling-party P-CSCF device sends a policy authentication message to a PCF network element. Correspondingly, the PCF network element receives the policy authentication message from the calling-party P-CSCF device.

For example, the policy authentication message is used to trigger establishment of a user plane tunnel of the IMS voice service of the calling terminal device.

For example, the policy authentication message includes identification information of the calling terminal device, an IMS application layer charging identifier, and media description information of the IMS voice service. The media description information of the IMS voice service may include one or more of the following information: a classifier identifier, bandwidth requirement description information, media type description information, and a QoS parameter.

It should be noted that the calling-party P-CSCF device may immediately send the policy authentication message (for example, an Npcf-Policy Authorization message) to the PCF network element, or may send the policy authentication message after receiving a 183 response message sent by the S-CSCF device in the calling IMS network.

If the 5G network in the wireless communications system in this embodiment is based on a service-based interface, the calling-party P-CSCF device sends the policy authentication message to the PCF network element, to invoke a policy authentication service provided by the PCF network element. Other network elements may communicate with each other based on a service-based interface or a point-to-point interface.

504. The PCF network element sends a session policy control message to an SMF network element. Correspondingly, the SMF network element receives the session policy control message from the PCF network element.

For example, the PCF network element sends the session policy control message (for example, an Npcf-SM Policy Control message) to the SMF network element based on the media description information carried in the policy authentication message sent by the calling-party P-CSCF device, to trigger a PDU session modification procedure, so that a network element in the 5G network is triggered to establish the user plane tunnel for the IMS voice service of the calling terminal device.

The session policy control message may carry a QoS rule. The QoS rule includes a QoS parameter set, a packet filter, and the like. The QoS parameter set usually includes one or more of the following QoS parameters: a guaranteed flow bit rate (GFBR for short) GFBR, an ARP, a 5QI, a maximum flow bit rate (MFBR for short), and the like.

505. After receiving the session policy control message sent by the PCF network element, the SMF network element sends a message direct transfer request (for example, an Namf-communication-N1N2messagetransfer request) to an AMF network element. Correspondingly, the PCF network element receives the message direct transfer request from the SMF network element. The message direct transfer request includes SM information. The SM information may be SM information of an N2 interface related to the user plane tunnel of the IMS voice service of the calling terminal device. The SM information may include a QoS parameter of the user plane tunnel corresponding to the IMS voice service of the calling terminal device, for example, a 5QI that is equal to 1, an ARP, a GFBR, and an MFBR.

506. The AMF network element sends an N2 session request to an NG-RAN device based on the received message direct transfer request sent by the SMF network element, where the SM information is transparently transmitted in the N2 session request. Correspondingly, the NG-RAN device receives the N2 session request from the AMF network element, to allocate, based on the SM information transparently transmitted in the N2 session request, a corresponding radio resource to the user plane tunnel whose 5QI is equal to 1.

507. The NG-RAN device sends a handover request to the AMF network element based on the SM information. Correspondingly, the AMF network element receives the handover request from the NG-RAN device. The handover request is used to indicate an SRVCC handover of the voice service of the calling terminal device from the 5G network to a 2G/3G network.

The AMF network element may indirectly communicate with an MSC network element based on the handover request by using an MME network element, to implement the handover of the calling terminal device from the 5G network to the 2G/3G network, or may directly communicate with an MSC network element, to implement the handover of the calling terminal device from the 5G network to the 2G/3G network. For details of the handover process, refer to related content in 302 in the foregoing embodiment. Details are not described herein again.

The NG-RAN device may send the handover request to the AMF network element based on the SM information and a first condition. The first condition includes one or more of the following conditions:

The NR-RAN device has a first handover capability. The first handover capability includes a capability of triggering a handover of the calling terminal device from the 5G network to the 2G/3G network. In an embodiment, the first handover capability may include a capability of triggering the handover of the calling terminal device from the 5G network to the 2G/3G network based on the SM information.

One or more of the AMF network element, the SMF network element, and a UPF network element have a second handover capability. The second handover capability includes a capability of supporting the handover of the calling terminal device from the 5G network to the 2G/3G network. In an embodiment, the handover from the 5G network to the 2G/3G network may be an SRVCC handover from the 5G network to the 2G/3G network.

The calling terminal device has a third handover capability. The third handover capability includes a capability of supporting a handover from an IMS voice service to a CS domain voice service. In an embodiment, the third handover capability may include at least one of a capability of supporting the handover from the IMS voice service to the CS domain voice service before alerting and a capability of supporting the handover from the IMS voice service to the CS domain voice service during alerting.

The calling terminal device subscribes to a service for handing over a voice service from the 5G network to the 2G/3G network.

The calling terminal device is located in a voice service coverage area of the 2G/3G network, the voice service of the calling terminal device cannot be implemented in the 5G network, the voice service of the calling terminal device cannot be implemented in an EPS network, and the calling terminal device is a voice-centric device.

The NG-RAN device may further forbid, based on the SM information and the first condition, an operation of allocating a radio resource of a first network to the user plane tunnel of the IMS voice service of the calling terminal device.

508. After receiving the SM information, the NG-RAN device further sends an N2 session response to the AMF network element. Correspondingly, the AMF network element receives the N2 session response from the NG-RAN device. The N2 session response includes third information, and the third information is used to indicate that establishment of the user plane tunnel of the voice service of the calling terminal device in the 5G network is accepted or rejected.

509. The AMF network element sends a session management context update request message (for example, an Nsmf-PDU Session-Update SM Context Request message) to the SMF network element based on the received N2 session response. Correspondingly, the SMF network element receives the session management context update request message from the AMF network element. The third information is transparently transmitted in the session management context update request message.

510. After receiving the third information, the SMF network element sends an N4 session modification request to the UPF network element. Correspondingly, the UPF network element receives the N4 session modification request from the SMF network element.

The N4 session modification request may further carry a data detection result, an enforcement rule, a reporting rule, core network (CN) tunnel information, and the like that are related to the user plane tunnel whose 5QI is equal to 1, so that the UPF can establish a corresponding core network tunnel for the user plane tunnel whose 5QI is equal to 1.

In an embodiment, the N4 session modification request may carry fourth information, and the fourth information is used to instruct the UPF network element to stop forwarding a data packet of the voice service of the calling terminal device. The SMF network element may determine, based on network configuration information or the first information sent by the NG-RAN device, that the handover from the 5G network to the 2G/3G network needs to be performed, and therefore add the fourth information.

In an embodiment, after receiving the third information, the SMF network element determines, based on network configuration information of the SMF network element or the first information sent by the NG-RAN device, that the handover from the 5G network to the 2G/3G network needs to be performed and no voice service needs to be established in the 5G network, and forbids sending an N4 session modification request to the UPF network element, so that the UPF network element does not establish a corresponding core network tunnel for the user plane tunnel whose 5QI is equal to 1.

In an embodiment, after receiving the third information, the SMF network element determines, based on network configuration information of the SMF network element or the first information sent by the NG-RAN device, that the handover from the 5G network to the 2G/3G network needs to be performed and no voice service needs to be established in the 5G network, and may send sixth information to the UPF network element. The sixth information is used to instruct to forbid the UPF network element to establish a corresponding core network tunnel for the user plane tunnel.

511. The UPF network element establishes, based on the N4 session modification request, the corresponding core network tunnel for the user plane tunnel whose 5QI is equal to 1.

After operation 511, the UPF network element further sends an N4 session modification response to the SMF network element, the SMF network element sends a session management policy control message to the PCF network element, and the PCF network element sends a policy authentication message to the calling-party P-CSCF device. In this way, the calling-party P-CSCF device may know whether the user plane tunnel of the IMS voice service is successfully established.

Correspondingly, in an embodiment, if receiving the fourth information, the UPF network element stops, based on the fourth information, forwarding the data packet of the voice service of the calling terminal device. In an embodiment, in a calling voice service establishment process, the UPF network element interrupts transmission of signaling data after the SIP 183 response message sent by the calling IMS network. The SIP 183 response message is sent by the called terminal device to the called IMS network, then is sent by the called IMS network to the calling IMS network, and then is sent by the calling IMS network to the calling terminal device.

Correspondingly, in an embodiment, if the UPF network element receives the sixth information, the UPF network element is forbidden, based on the sixth information, to establish the corresponding core network tunnel for the user plane tunnel.

In an embodiment, after requesting to initiate a calling voice service in the 5G network, the calling terminal device is handed over to the 2G/3G network by using an SRVCC handover procedure. That is, the IMS voice service of the calling terminal device is changed to a CS domain voice service through handover, and the CS domain voice service continues to be implemented in the 2G/3G network. This ensures that the calling terminal device in the 5G network can still implement a voice service when the 5G network does not support the IMS voice service and there is no 4G network that can support the IMS voice service.

Figure 6:
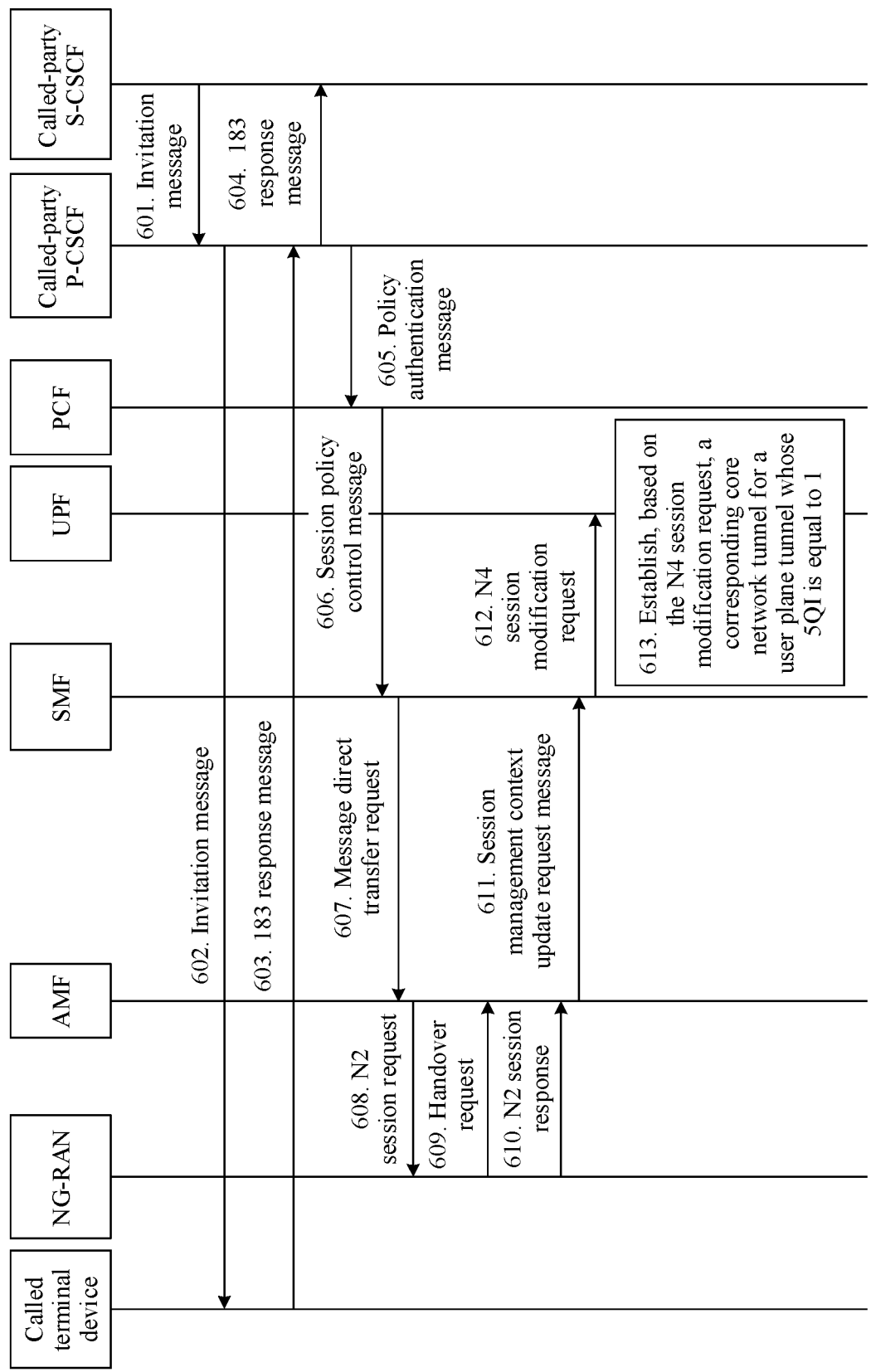
FIG. 6 is a schematic flowchart of another method embodiment according to an embodiment of this application.

Referring to FIG. 6, an embodiment of this application provides a method embodiment of a called voice service establishment method. This embodiment may be applied to the wireless communications system shown in FIG. 1 or FIG. 2. FIG. 6 is described with reference to FIG. 5. As shown in FIG. 6, the method may include the following operations.

It should be noted that a 5G network in a wireless communications system in this embodiment may be based on a service-based interface or a point-to-point interface. This is not limited in this embodiment of this application.

601. A called-party S-CSCF device sends an invitation message to a called-party P-CSCF device. Correspondingly, the called-party P-CSCF device receives the invitation message from the called-party S-CSCF device, and establishes an IMS voice session for a called terminal device based on the invitation message.

The invitation message is used to request to establish a called PS domain voice service for the called terminal device in the 5G network.

602. The called-party P-CSCF device sends the invitation message to the called terminal device. Correspondingly, the called terminal device receives the invitation message from the called-party P-CSCF device.

603. The called terminal device sends a 183 response message to the called-party P-CSCF device. Correspondingly, the called-party P-CSCF device receives the 183 response message from the called terminal device.

604. The called-party P-CSCF device sends the 183 response message to the called-party S-CSCF device. Correspondingly, the called-party S-CSCF device receives the 183 response message from the called-party P-CSCF device.

The called-party S-CSCF device may further send the 183 response message to a calling-party S-CSCF device, and the calling-party S-CSCF device may further send the 183 response message to a calling-party P-CSCF device. If receiving the 183 response message sent by the calling-party S-CSCF device, the calling-party P-CSCF device may forward the 183 response message to a calling terminal device.

Operations 605 to 613 are basically the same as operations 503 to 511 in the embodiment corresponding to FIG. 5. Details are not described herein again. A difference includes that the actions performed by the calling terminal device in operations 503 to 511 are performed by the called terminal device in operations 605 to 613.

If receiving fourth information, a UPF network element stops, based on the fourth information, forwarding a data packet of the voice service of the called terminal device. Specifically, in a called voice service establishment process, the UPF network element interrupts transmission of signaling data after an SIP Prack message sent by a called IMS network. The SIP Prack message is sent by the calling terminal device to a calling IMS network, then is sent by the calling IMS network to the called IMS network, and then is sent by the called IMS network to the called terminal device.

In the prior art, when a terminal device registers with a 5G network, whether the 5G network supports a PS domain voice service needs to be determined. If the 5G network does not support the PS domain voice service, the terminal device needs to be handed over to another network through reselection. It may be learned that in this operation, even if the terminal device is located in a signal coverage area of the 5G network, if the 5G network does not support an IMS voice service, the terminal device cannot enjoy a high-speed data service. To resolve the technical problem, this application provides an information obtaining method. Details are described below.

Figure 7:
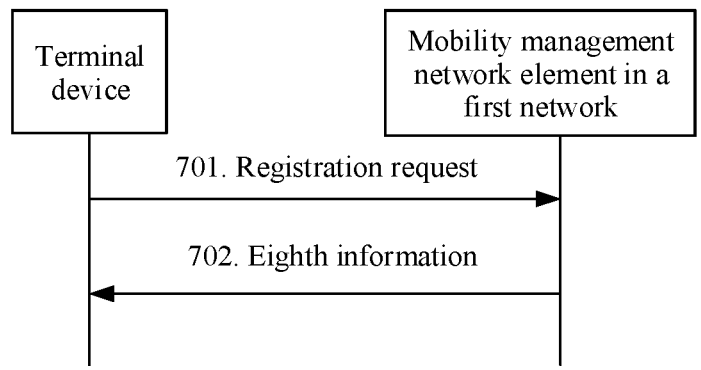
FIG. 7 is a schematic flowchart of another method embodiment according to an embodiment of this application.

FIG. 7 is a schematic flowchart of an information obtaining method according to an embodiment of this application. A terminal device may be a calling terminal device or a called terminal device.

The method in this embodiment includes the following operations.

701. A mobility management network element in a first network receives a registration request from the terminal device. Correspondingly, the mobility management network element receives the registration request. The registration request is used to request to register the terminal device with the first network.

The registration request may be transparently transmitted to the mobility management network in the first network by using an access network device in the first network. For example, the terminal device sends the registration request to an NG-RAN device, and the NG-RAN device transparently transmits the registration request to an AMF network element.

702. The mobility management network element in the first network sends eighth information to the terminal device based on the registration request and a second handover condition. Correspondingly, the terminal device receives the eighth information from the mobility management network element in the first network. The eighth information indicates that a PS domain voice service is supported.

In an embodiment, the second handover condition includes: The first network supports a handover of the terminal device from the first network to a second network. The second network is a network that supports a circuit switched domain voice service. Specifically, the second handover condition may include: The first network supports a handover of a voice service of the terminal device from the first network to the second network. In addition, the handover from the first network to the second network may be an SRVCC handover from the first network to the second network. The eighth information may be carried in a registration success message or a registration failure message.

For example, after receiving the registration request, and determining that a 5G network supports an SRVCC handover of the terminal device from the 5G network to a 2G/3G network, the AMF network element sends, to the terminal device, the eighth information indicating that the PS domain voice service is supported. The eighth information may be carried in the registration success message or the registration failure message. After receiving the eighth information, the terminal device can determine, based on the eighth information, that the PS domain voice service is supported, and therefore does not need to be handed over to a network other than the 5G network through reselection. In addition, the terminal device cannot sense whether the 5G network supports an IMS voice service or whether the 5G network supports the SRVCC handover from the 5G network to the 2G/3G network.

It may be learned from the foregoing technical solution that when the terminal device registers with the 5G network, the 5G network does not need to really support the PS domain voice service of the terminal device, and if it is determined that the second handover condition is met, that is, the 5G network supports the handover of the terminal device from the 5G network to the 2G/3G network, it may be considered that the PS domain voice service is supported. Therefore, the terminal device does not need to be handed over to another network through reselection, and the terminal device in the 5G network may enjoy a high-speed data service before a voice service is established. In addition, when a voice service needs to be established, with reference to the voice service establishment method in any one of the foregoing embodiments in FIG. 3 to FIG. 6, the terminal device may be handed over to the 2G/3G network to establish a CS domain voice service.

The following describes the second handover condition.

In an embodiment, the second handover condition includes: The access network device in the first network has a first handover capability. For specific capability information included in the first handover capability, refer to related content in 403. Details are not described herein again. In an embodiment, when establishing an interface connection to the mobility management network element in the first network or when transparently transmitting the registration request of the terminal device to the mobility management network element in the first network, the access network device in the first network may report information about whether the access network device in the first network has the first handover capability to the mobility management network element in the first network.

For example, the terminal device sends the registration request to the NG-RAN device, and when the NG-RAN device transparently transmits the registration request to the AMF network element, the NG-RAN device may send information about whether the NG-RAN device has the first handover capability to the AMF network element. Alternatively, when establishing an N2 interface connection to the AMF network element, the NG-RAN device may send information about whether the NG-RAN device has the first handover capability to the AMF network element. The AMF network element determines, based on the received information, whether the NG-RAN device has the first handover capability.

In an embodiment, the second handover condition includes: A core network device in the first network has a second handover capability. For specific capability information included in the second handover capability, refer to related content in 404. Details are not described herein again. In an embodiment, the mobility management network element in the first network may determine, based on network configuration information of the mobility management network element in the first network, whether the core network device in the first network has the foregoing capability. Alternatively, the core network device in the first network may send information about whether the core network device in the first network has the foregoing capability to the access network device in the first network.

For example, the AMF network element can determine, based on network configuration information of the AMF network element, whether the AMF network element, an SMF network element, and a UPF network element have the second handover capability. Alternatively, the SMF network element may send information about whether the SMF network element has the second handover capability to the AMF network element. Alternatively, the UPF network element sends information about whether the UPF network element has the second handover capability to the AMF network element by using the SMF network element.

In an embodiment, the second handover condition includes: The terminal device has a third handover capability. For specific capability information included in the third handover capability, refer to related content in 405. Details are not described herein again. In an embodiment, the terminal device may send information about whether the terminal device has the third handover capability to the mobility management network element in the first network by adding the information to the registration request. Alternatively, when establishing an interface connection to the mobility management network element in the first network or when transparently transmitting the registration request to the mobility management network element in the first network, the access network device in the first network may report, to the mobility management network element in the first network, information that is about whether the terminal device has the third handover capability and that is obtained on an air interface side.

For example, the terminal device sends the registration request to the NG-RAN device. The registration request may carry information about whether the terminal device has the third handover capability. In addition, when transparently transmitting the registration request to the AMF network element, the NG-RAN device may send, to the AMF network element, information that is about whether the terminal device has the third handover capability and that is obtained on an air interface side. Alternatively, when establishing the N2 interface connection to the AMF network element, the NG-RAN device may send, to the AMF network element, information that is about whether the terminal device has the third handover capability and that is obtained on an air interface side. The AMF network element determines, based on the received information, whether the terminal device has the third handover capability.

In an embodiment, the second handover condition includes one or more of the following conditions: The terminal device subscribes to a service for handing over a voice service from the first network to the second network, the terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network. For example, when the second network is the 2G/3G network, and the first network is the 5G network, the third network is an intermediate-state evolved network between the 2G/3G network and the 5G network, for example, may be an EPS network.

For example, when the terminal device requests to register with the 5G network, the AMF network element may obtain subscription information of the terminal device from a UDM/HSS network element. The AMF network element determines, based on the subscription information of the terminal device, that the terminal device subscribes to a service for handing over a voice service from the 5G network to the 2G/3G network. For example, the AMF network element may determine, based on at least one of a C-MSISDN and an STN-SR in the subscription information of the terminal device, that the terminal device subscribes to the foregoing service.

For example, the terminal device sends the registration request to the NG-RAN device. The registration request may carry information used to indicate that the terminal device is a voice-centric device. Alternatively, when transparently transmitting the registration request to the AMF network element, the NG-RAN device may send, to the AMF network element, information that is obtained on an air interface side and that is used to indicate that the terminal device is a voice-centric device. Alternatively, when establishing an N2 interface connection to the AMF network element, the NG-RAN device may send, to the AMF network element, information that is obtained on an air interface side and that is used to indicate that the terminal device is a voice-centric device. The AMF network element determines, based on the received information, that the terminal device is a voice-centric device.

In addition, for a specific manner of determining that the terminal device is located in the voice service coverage area of the 2G/3G network, a specific manner of determining that the voice service of the terminal device cannot be implemented in the 5G network, and a specific manner of determining that the voice service of the terminal device cannot be implemented in the EPS network, refer to related content in 406. Details are not described herein again.

It should be noted that the second handover condition may include any one or more of the foregoing conditions. This is not limited in this embodiment of this application.

Correspondingly, in a process in which the mobility management network element in the first network obtains the second handover condition, the access network device in the first network may further send, to the mobility management network element in the first network, any one of information about whether the access network device in the first network has the first handover capability and information about whether the terminal device has the third handover capability. In an embodiment, the first handover capability includes a capability of triggering the handover of the terminal device from the first network to the second network based on SM information. In an embodiment, the third handover capability includes a capability of supporting a handover from an IMS voice service of the terminal device to a CS domain voice service of the terminal device.

In the foregoing embodiments provided in this application, various solutions of the voice service establishment method provided in the embodiments of this application are described from perspectives of each network element and interaction between network elements. It may be understood that to implement the foregoing function, each network element and device, for example, the access network device in the first network, the session management network element in the first network, the terminal device, and the mobility management network element in the first network, include a corresponding hardware structure and/or a software module for executing each function. A person skilled in the art should easily be aware that, in combination with units and algorithm operations of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 8:
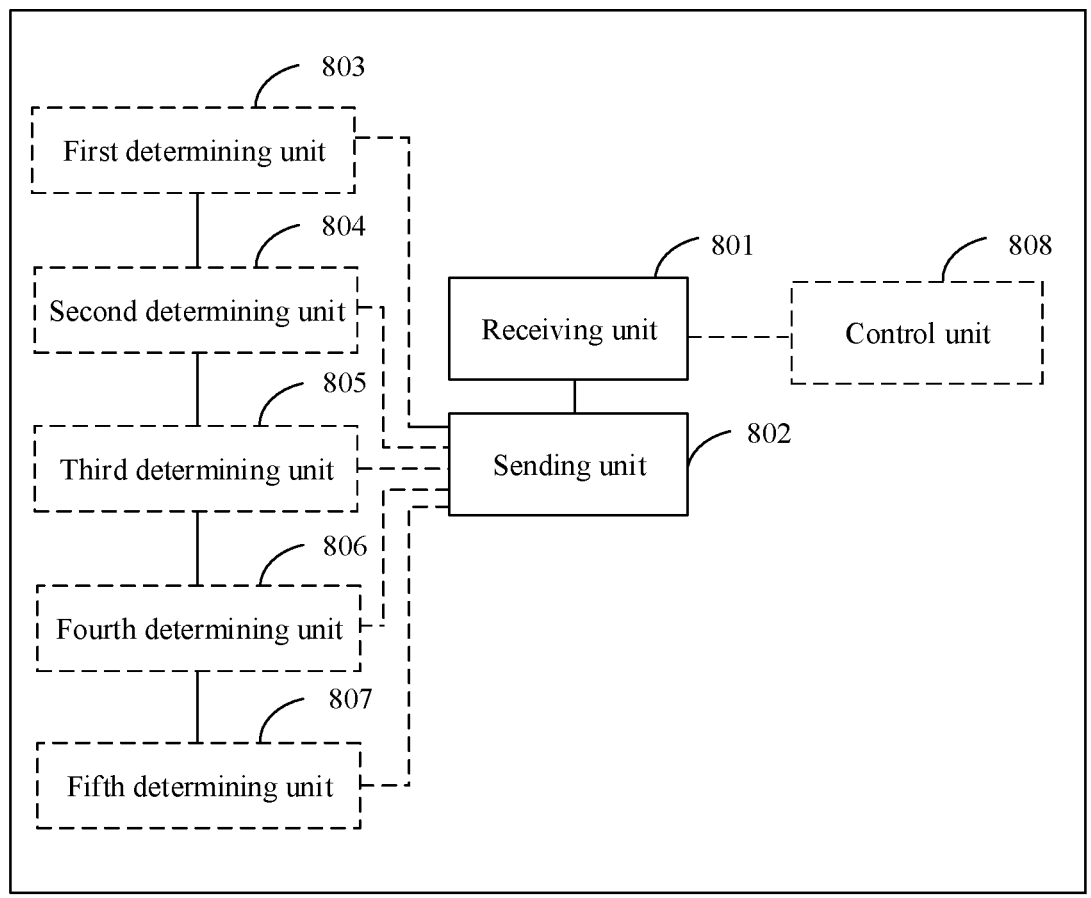
FIG. 8 is a schematic structural diagram of an apparatus embodiment according to an embodiment of this application.

For example, the foregoing network element implements a corresponding function by using a software module. Referring to FIG. 8, this application provides an apparatus. The apparatus includes a receiving unit 801 and a sending unit 802.

In an embodiment, the apparatus may be a voice service establishment apparatus, and the apparatus may be configured to perform the operation of the access network device (for example, the NG-RAN device) in the first network in FIG. 3 to FIG. 6. For example, the receiving unit 801 is configured to receive session management information from a session management network element in a first network, where the session management information is used to request to establish a user plane tunnel of a voice service of a terminal device in the first network; and the sending unit 802 is configured to send a handover request to a mobility management network element in the first network based on the session management information, where the handover request is used to indicate a handover of the terminal device from the first network to a second network that supports a circuit switched domain voice service.

Therefore, when the receiving unit receives the SM information used to request to establish the user plane tunnel of the voice service of the terminal device in the first network, it indicates that the terminal device is located in the first network. In this case, if the voice service of the terminal device cannot be established in the first network, the sending unit sends the handover request to the mobility management network element in the first network based on the SM information, where the handover request is used to indicate the handover of the terminal device from the first network to the second network, to establish a CS domain voice service of the terminal device in the second network.

In an embodiment, the handover request is used to indicate a handover of the voice service of the terminal device from the first network to the second network.

In an embodiment, the apparatus further includes:

a first determining unit 803, configured to determine that an access network device in the first network has a first handover capability. The first handover capability includes a capability of triggering the handover of the terminal device from the first network to the second network.

In an embodiment, the first handover capability includes a capability of triggering the handover of the voice service of the terminal device from the first network to the second network.

In an embodiment, the first handover capability includes a capability of triggering the handover of the terminal device from the first network to the second network based on the session management information.

In an embodiment, the apparatus further includes:

a second determining unit 804, configured to determine that a first handover condition is met. The first handover condition includes one or more of the following conditions: The terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In an embodiment, the apparatus further includes:

a third determining unit 805, configured to determine that a core network device in the first network has a second handover capability. The second handover capability includes a capability of supporting the handover of the terminal device from the first network to the second network. The core network device in the first network includes one or more of the following network elements: the mobility management network element in the first network, the session management network element in the first network, and a user plane function network element in the first network.

In an embodiment, the second handover capability includes a capability of supporting the handover of the voice service of the terminal device from the first network to the second network.

In an embodiment, the apparatus further includes:

a fourth determining unit 806, configured to determine that the terminal device has a third handover capability. The third handover capability includes a capability of supporting a handover from an internet protocol multimedia subsystem voice service to a circuit switched domain voice service.

In an embodiment, the apparatus further includes a fifth determining unit 807, configured to determine that the terminal device subscribes to a service for handing over a voice service from the first network to the second network.

In an embodiment, the apparatus further includes:

a control unit 808, configured to forbid, based on the session management information, an operation of allocating a radio resource of the first network to the voice service of the terminal device.

In an embodiment, the sending unit is further configured to send first information to the session management network element in the first network. The first information is used to notify the session management network element in the first network of the handover of the terminal device from the first network to the second network.

In an embodiment, the sending unit is further configured to send second information to the mobility management network element in the first network. The second information is used to indicate returning of the terminal device from the second network to the first network after the voice service of the terminal device ends.

In an embodiment, the second information is used to indicate returning of the voice service of the terminal device from the second network to the first network after the voice service of the terminal device ends.

In an embodiment, the sending unit is further configured to send, to the mobility management network element in the first network, at least one of information about whether the access network device in the first network has the first handover capability and information about whether the terminal device has the third handover capability. The first handover capability includes the capability of triggering the handover of the terminal device from the first network to the second network, and the third handover capability includes the capability of supporting the handover from the internet protocol multimedia subsystem voice service of the terminal device to the circuit switched domain voice service of the terminal device.

In addition, the receiving unit 801 and the sending unit 802 in the voice service establishment apparatus may further implement another operation or function of the access network device in the first network in the foregoing method. Details are not described herein.

In another embodiment, the apparatus shown in FIG. 8 may be a voice service establishment apparatus, and the apparatus may be configured to perform the operation of the session management network element (for example, the SMF network element) in the first network in FIG. 4A and FIG. 4B to FIG. 6. For example, the receiving unit 801 is configured to receive third information from an access network device in a first network, where the third information is used to indicate that establishment of a user plane tunnel of a voice service of a terminal device in the first network is accepted or rejected; and the sending unit 802 is configured to send fourth information to a user plane function network element in the first network, where the fourth information is used to instruct the user plane function network element in the first network to stop forwarding a data packet of the voice service of the terminal device.

Therefore, according to the apparatus provided in this embodiment, the user plane function network element in the first network is instructed to stop forwarding the data packet of the voice service of the terminal device, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

In an embodiment, the receiving unit is further configured to receive first information from the access network device in the first network. The first information is used to notify a handover of the terminal device from the first network to a second network.

In an embodiment, the first information is used to notify a handover of the voice service of the terminal device from the first network to the second network.

In an embodiment, the sending unit is configured to send the fourth information to the user plane function network element in the first network based on the first information.

In addition, the receiving unit 801 and the sending unit 802 in the voice service establishment apparatus may further implement another operation or function of the session management network element in the first network in the foregoing method. Details are not described herein.

In another embodiment, the apparatus shown in FIG. 8 may alternatively be an information obtaining apparatus, and the apparatus may be configured to perform the operation of the mobility management network element (for example, the AMF network element) in the first network in FIG. 7. For example, the receiving unit 801 is configured to receive a registration request from a terminal device, where the registration request is used to request to register the terminal device with a first network; and the sending unit 802 is configured to send eighth information to the terminal device based on the registration request and a second handover condition, where the eighth information indicates that a packet switched domain voice service is supported, the second handover condition includes: The first network supports a handover of the terminal device from the first network to a second network, and the second network supports a circuit switched domain voice service.

According to the apparatus provided in this embodiment, when the terminal device registers with the first network, the first network does not need to really support the PS domain voice service of the terminal device, and if it is determined that the second handover condition is met, that is, the first network supports the handover of the terminal device from the first network to the second network, it may be considered that the PS domain voice service is supported. Therefore, the terminal device does not need to be handed over to another network through reselection, and the terminal device in the first network may enjoy a high-speed data service before a voice service is established.

In an embodiment, the second handover condition includes: The first network supports a handover of the voice service of the terminal device from the first network to the second network.

In an embodiment, the second handover condition includes: An access network device in the first network has a first handover capability. The first handover capability includes a capability of triggering the handover of the terminal device from the first network to the second network.

In an embodiment, the first handover capability includes a capability of triggering the handover of the voice service of the terminal device from the first network to the second network.

In an embodiment, the first handover capability includes a capability of triggering the handover of the terminal device from the first network to the second network based on session management information. The session management information is used to request to establish a user plane tunnel of the voice service of the terminal device in the first network.

In an embodiment, the second handover condition further includes: A core network device in the first network has a second handover capability. The second handover capability includes a capability of supporting the handover of the terminal device from the first network to the second network. The core network device in the first network includes one or more of the following network elements: a mobility management network element in the first network, a session management network element in the first network, and a user plane function network element in the first network.

In an embodiment, the second handover capability includes a capability of supporting the handover of the voice service of the terminal device from the first network to the second network.

In an embodiment, the second handover condition further includes:

The terminal device has a third handover capability. The third handover capability includes a capability of supporting a handover from an internet protocol multimedia subsystem voice service to a circuit switched domain voice service.

In an embodiment, the third handover capability includes at least one of a capability of supporting the handover from the internet protocol multimedia subsystem voice service to the circuit switched domain voice service before alerting and a capability of supporting the handover from the internet protocol multimedia subsystem voice service to the circuit switched domain voice service during alerting.

In an embodiment, the second handover condition further includes one or more of the following conditions: The terminal device subscribes to a service for handing over a voice service from the first network to the second network, the terminal device is located in a voice service coverage area of the second network, the voice service of the terminal device cannot be implemented in the first network, the voice service of the terminal device cannot be implemented in a third network, and the terminal device is a voice-centric device. The third network is an intermediate-state evolved network between the second network and the first network.

In addition, the receiving unit 801 and the sending unit 802 in the information obtaining apparatus may further implement another operation or function of the mobility management network element in the first network in the foregoing method. Details are not described herein.

Figure 9:
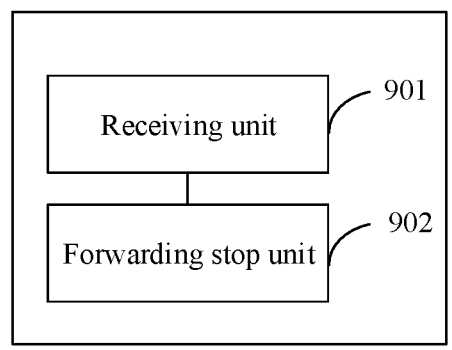
FIG. 9 is a schematic structural diagram of another apparatus embodiment according to an embodiment of this application.

Referring to FIG. 9, this application provides an information processing apparatus. The apparatus includes a receiving unit 901 and a forwarding stop unit 902.

In an embodiment, the apparatus may be configured to perform the operation of the user plane function network element (for example, the UPF network element) in the first network in FIG. 4A and FIG. 4B to FIG. 6. For example, the receiving unit 901 is configured to receive fourth information from a session management network element in a first network; and the forwarding stop unit 902 is configured to stop, based on the fourth information, forwarding a data packet of a voice service of a terminal device.

According to the apparatus provided in this embodiment, forwarding of the data packet of the voice service of the terminal device is stopped, so that a network device and the terminal device in the first network are prevented from performing unnecessary operations, to save network resources.

In an embodiment, the data packet of the voice service of the terminal device includes at least one of an uplink data packet of the voice service of the terminal device and a downlink data packet of the voice service of the terminal device.

In addition, the receiving unit 901 and the forwarding stop unit 902 in the information processing apparatus may further implement another operation or function of the user plane function network element in the first network in the foregoing method. Details are not described herein.

Figure 10:
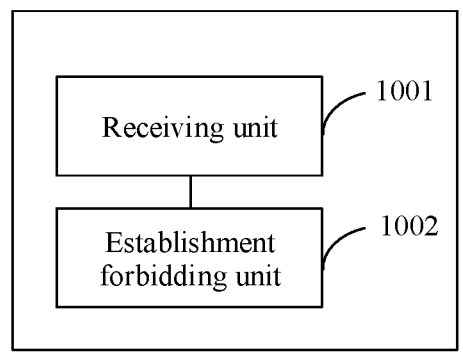
FIG. 10 is a schematic structural diagram of another apparatus embodiment according to an embodiment of this application.

Referring to FIG. 10, this application provides an information processing apparatus. The apparatus includes a receiving unit 1001 and an establishment forbidding unit 1002.

In an embodiment, the apparatus may be configured to perform the operation of the session management network element (for example, the SMF network element) in the first network in FIG. 4A and FIG. 4B to FIG. 6. For example, the receiving unit 1001 is configured to receive third information from an access network device in a first network, where the third information is used to indicate that establishment of a user plane tunnel of a voice service of a terminal device in the first network is accepted or rejected; and the establishment forbidding unit 1002 is configured to forbid an operation of establishing a core network tunnel corresponding to the user plane tunnel.

Therefore, according to the apparatus provided in this embodiment, the operation of establishing the core network tunnel is forbidden, so that a network device and the terminal device in the first network are prevented from performing unnecessary operations, to save network resources.

In an embodiment, the establishment forbidding unit is configured to forbid sending fifth information to a user plane function network element in the first network. The fifth information is used to instruct the user plane function network element in the first network to establish the corresponding core network tunnel for the user plane tunnel.

In an embodiment, the establishment forbidding unit is configured to send sixth information to a user plane function network element in the first network. The sixth information is used to instruct to forbid the user plane function network element in the first network to establish the corresponding core network tunnel for the user plane tunnel.

In an embodiment, the receiving unit is further configured to receive first information from the access network device in the first network. The first information is used to notify a handover of the terminal device from the first network to a second network.

In an embodiment, the first information is used to notify a handover of the voice service of the terminal device from the first network to the second network.

In an embodiment, the establishment forbidding unit is configured to forbid, based on the first information, the operation of establishing the core network tunnel corresponding to the user plane tunnel.

In addition, the receiving unit 1001 and the establishment forbidding unit 1002 in the information processing apparatus may further implement another operation or function of the session management network element in the first network in the foregoing method. Details are not described herein.

Figure 11:
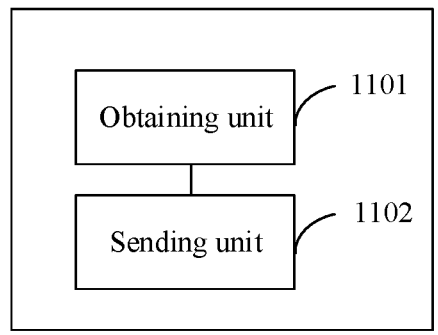
FIG. 11 is a schematic structural diagram of another apparatus embodiment according to an embodiment of this application.

Referring to FIG. 11, this application provides a network handover apparatus. The apparatus includes an obtaining unit 1101 and a sending unit 1102.

In an embodiment, the apparatus may be configured to perform the operation of the mobile switching network element (for example, the MSC network element) in the second network in operation 413. For example, the obtaining unit 1101 is configured to obtain second information from a mobility management network element in a first network, where the second information is used to indicate returning of a terminal device from a second network to the first network after a voice service in the second network ends, and the voice service in the second network is a voice service handed over from the first network to the second network; and the sending unit 1102 is configured to send seventh information to a base station in the second network based on the second information, where the seventh information is used to instruct the base station in the second network to trigger returning of the terminal device to the first network after the voice service in the second network ends.

According to the apparatus provided in this embodiment, after the voice service of the terminal device in the second network ends, the terminal device is immediately returned to the first network.

In an embodiment, the seventh information includes at least one of the second information and identification information of the first network.

In an embodiment, the seventh information is used to instruct the base station in the second network to trigger returning of the voice service of the terminal device to the first network after the voice service in the second network ends.

In addition, the obtaining unit 1101 and the sending unit 1102 in the network handover apparatus may further implement another operation or function of the mobile switching network element in the second network in the foregoing method. Details are not described herein.

Figure 12:
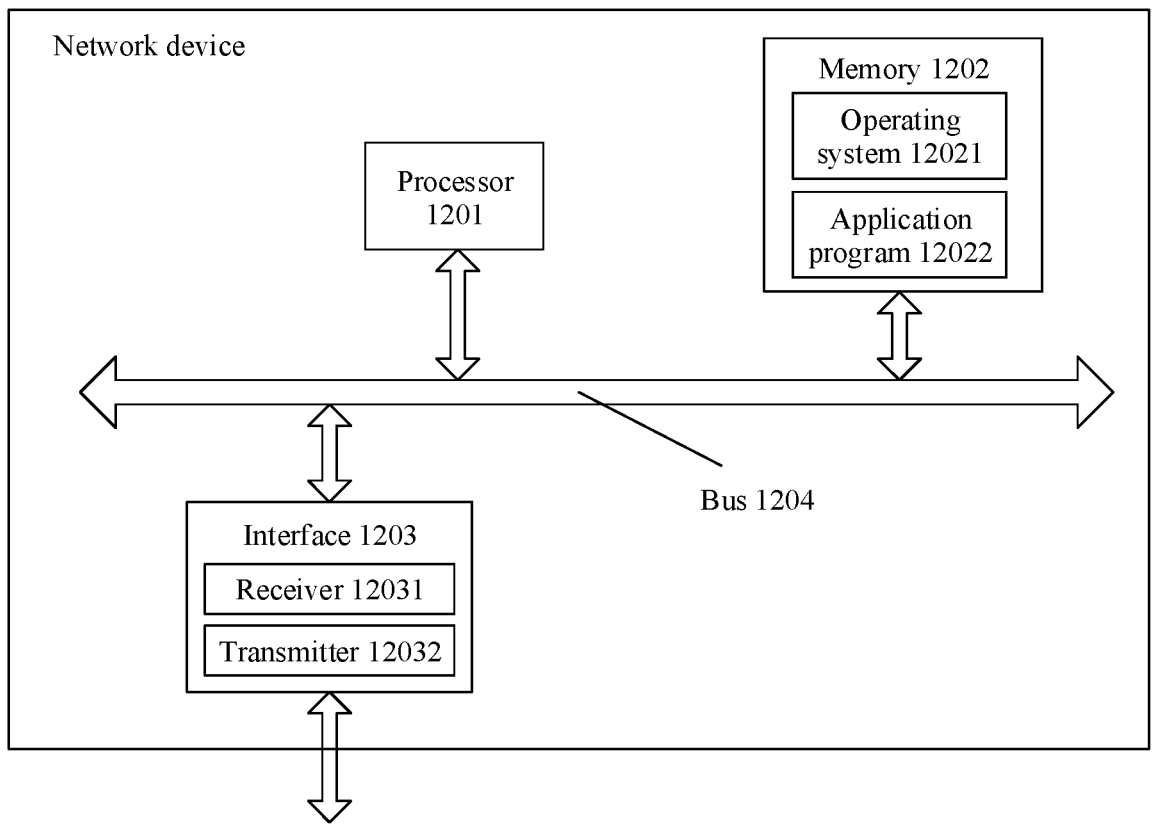
FIG. 12 is a schematic structural diagram of a network device according to an embodiment of this application.

Referring to FIG. 12, an embodiment of the present invention provides an apparatus embodiment of a network device. The network device in this embodiment includes a processor 1201, a memory 1202, an interface 1203, and a bus 1204. The interface 1203 may be implemented in a wireless or wired manner, and specifically, may be an element such as a network interface card. The processor 1201, the memory 1202, and the interface 1203 are connected by using the bus 1204. The interface 1203 further includes a receiver 12031 and a transmitter 12032.

The processor 1201 may be a central processing unit (CPU for short), an application-specific integrated circuit (ASIC for short), or one or more integrated circuits configured to implement this embodiment of this application.

In this embodiment, the memory 1202 includes an operating system 12021 and an application program 12022, and is configured to store a program, code, or an instruction. When executing the program, the code, or the instruction, the processor or a hardware device may complete the methods shown in FIG. 3 to FIG. 7. The memory may include a random access memory (RAM for short), or may be a non-volatile memory, for example, at least one magnetic disk memory.

The network device may be an access network device in a first network, a mobility management network element in a first network, a session management network element in a first network, or a user plane function network element in a first network.

For example, in an embodiment, the processor 1201 is configured to implement another operation or function of any one of the access network devices in the first network in FIG. 3 to FIG. 6. The receiver 12031 is configured to implement communication between the access network device in the first network and a terminal device/the mobility management network element in the first network.

In another embodiment, the processor 1201 is configured to implement another operation or function of any one of the mobility management network elements in the first network in FIG. 4A and FIG. 4B to FIG. 7. The receiver 12031 is configured to implement communication between the mobility management network element in the first network and the access network device in the first network, a mobility management network element in a third network, or a mobile switching network element in a second network.

In another embodiment, the processor 1201 is configured to implement another operation or function of any one of the session management network elements in the first network in FIG. 4A and FIG. 4B to FIG. 6. The receiver 12031 is configured to implement communication between the session management network element in the first network and the access network device in the first network.

In another embodiment, the processor 1201 is configured to implement another operation or function of any one of the user plane function network elements in the first network in FIG. 4A and FIG. 4B to FIG. 6. The receiver 12031 is configured to implement communication between the user plane function network element in the first network and the session management network element in the first network.

An embodiment of this application further provides a computer-readable storage medium that includes an instruction. When the instruction runs on a computer, the computer is enabled to perform the foregoing method.

An embodiment of this application further provides a computer program product that includes an instruction. When the computer program product runs on a computer, the computer is enabled to perform the foregoing method.

In the specification, claims, and accompanying drawings of the present invention, the terms "first", "second", "third", "fourth", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A voice service establishment method, comprising:
    establishing, in a first network, a data service connection between an access network device and a terminal device;
    receiving, by the access network device in the first network, session management information from a session management network element in the first network, wherein the session management information is used to request to establish a user plane tunnel of a voice service of a terminal device in the first network;
    prior to establishing the user plane tunnel of the voice service of the terminal device in the first network, determining, by the access network device, that a handover condition is met, wherein the handover condition comprises the following conditions: the terminal device is located in a voice service coverage area of a second network, the voice service of the terminal device is not supported in the first network, the voice service of the terminal device is not supported in a third network, and the terminal device is a voice-centric device, wherein the third network is an intermediate-state evolved network between the second network and the first network;

forbidding, by the access network device based on the session management information, an operation of allocating a radio resource of the first network to establish the voice service of the terminal device;

sending, by the access network device, a handover request to a mobility management network element in the first network based on the session management information, wherein the handover request is used to indicate a handover of the terminal device from the first network to the second network that supports a circuit switched domain voice service; and returning the terminal device to the first network after the voice service of the terminal device in the second network ends.

2. The method according to claim 1, further comprising:
determining, by the access network device, that the access network device has a first handover capability, wherein the first handover capability comprises a capability of triggering the handover of the terminal device from the first network to the second network.

3. The method according to claim 2, wherein terminal device is switched from the first network to the second network based on the session management information.

4. The method according to claim 1, further comprising:
determining, by the access network device, that a core network device in the first network has a second handover capability, wherein the second handover capability comprises a capability of supporting the handover of the terminal device from the first network to the second network, wherein the core network device comprises one or more of the following network elements: the mobility management network element in the first network, the session management network element in the first network, or a user plane function network element in the first network.

5. The method according to claim 1, further comprising:
determining, by the access network device, that the terminal device has a third handover capability, wherein the third handover capability comprises a capability of supporting a handover from an internet protocol multimedia subsystem voice service to a circuit switched domain voice service.

6. The method according to claim 1, further comprising:
determining, by the access network device, that the terminal device subscribes to a service for handing over a voice service from the first network to the second network.

7. The method according to claim 1, further comprising:
sending, by the access network device, first information to the session management network element in the first network to notify the session management network element of the handover of the terminal device from the first network to the second network.

8. The method according to claim 1, wherein the method further comprises:
sending, by the access network device in the first network, second information to the mobility management network element in the first network, wherein the second information is used to indicate returning of the terminal device from the second network to the first network after the voice service of the terminal device ends.

9. The method according to claim 1, wherein the method further comprises:
sending, by the access network device in the first network, at least one of information about whether the access network device in the first network has a first handover capability and information about whether the terminal device has a third handover capability to the mobility management network element in the first network, wherein the first handover capability comprises a capability of triggering the handover of the terminal device from the first network to the second network, and the third handover capability comprises a capability of supporting a handover from an internet protocol multimedia subsystem voice service of the terminal device to a circuit switched domain voice service of the terminal device.

10. A voice service establishment apparatus, comprising:
a processor; and
a memory coupled to store instructions, which when executed by the processor, cause the processor to perform operations, the operations including
establishing, in a first network, a data service connection with a terminal device;
receiving session management information from a session management network element in the first network, wherein the session management information is used to request to establish a user plane tunnel of a voice service of a terminal device in the first network,
prior to establishing the user plane tunnel of the voice service of the terminal device in the first network, determining that a handover condition is met, wherein the handover condition comprises the following conditions: the terminal device is located in a voice service coverage area of a second network, the voice service of the terminal device ca is not supported in the first network, the voice service of the terminal device is not supported in a third network, and the terminal device is a voice-centric device, wherein the third network is an intermediate-state evolved network between the second network and the first network;
forbidding, based on the session management information, an operation of allocating a radio resource of the first network to establish the voice service of the terminal device;
sending a handover request to a mobility management network element in the first network based on the session management information, wherein the handover request is used to indicate a handover of the terminal device from the first network to the second network that supports a circuit switched domain voice service; and
returning the terminal device to the first network after the voice service of the terminal device in the second network ends.

11. The apparatus according to claim 10, wherein the operations further comprise:
determining that an access network device in the first network has a first handover capability, wherein the first handover capability comprises a capability of triggering the handover of the terminal device from the first network to the second network.

12. The apparatus according to claim 11, wherein the first handover capability comprises:
a capability of triggering the handover of the terminal device from the first network to the second network based on the session management information.

13. The apparatus according to claim 10, wherein the operations further comprise:
determining that a core network device in the first network has a second handover capability, wherein the second handover capability comprises a capability of supporting the handover of the terminal device from the first network to the second network, and the core network device in the first network comprises one or more of the following network elements: the mobility management network element in the first network, the session management network element in the first network, or a user plane function network element in the first network.

14. The apparatus according to claim 10, wherein the operations further comprise:
determining that the terminal device has a third handover capability, wherein the third handover capability comprises a capability of supporting a handover from an internet protocol multimedia subsystem voice service to a circuit switched domain voice service.

15. The apparatus according to claim 10, wherein the operations further comprise:
determining that the terminal device subscribes to a service for handing over a voice service from the first network to the second network.

16. The apparatus according to claim 10, sending first information to the session management network element in the first network, wherein the first information is used to notify the session management network element in the first network of the handover of the terminal device from the first network to the second network.

17. The apparatus according to claim 10, wherein the operations further comprise:
sending second information to the mobility management network element in the first network, wherein the second information is used to indicate returning of the terminal device from the second network to the first network after the voice service of the terminal device ends.

18. A non-transitory computer storage medium having computer instructions stored therein, which when executed by a processor, cause the processor to perform voice service establishment operations, the operations including
establishing, in a first network, a data service connection between an access network device and a terminal device;
receiving session management information from a session management network element in the first network, wherein the session management information is used to request to establish a user plane tunnel of a voice service of a terminal device in the first network;
prior to establishing the user plane tunnel of the voice service of the terminal device in the first network, determining that a handover condition is met, wherein the handover condition comprises the following conditions: the terminal device is located in a voice service coverage area of a second network, the voice service of the terminal device is not supported in the first network, the voice service of the terminal device is not supported in a third network, and the terminal device is a voice-centric device, wherein the third network is an intermediate-state evolved network between the second network and the first network;
forbidding, based on the session management information, an operation of allocating a radio resource of the first network to establish the voice service of the terminal device;
sending a handover request to a mobility management network element in the first network based on the session management information, wherein the handover request is used to indicate a handover of the terminal device from the first network to the second network that supports a circuit switched domain voice service; and
returning the terminal device to the first network after the voice service of the terminal device in the second network ends.

19. The computer storage medium according to claim 18, wherein the operations further comprise:
determining that an access network device in the first network has a first handover capability, wherein the first handover capability comprises a capability of triggering the handover of the terminal device from the first network to the second network.

* * * * *

UNITED STATES PATENT AND TRADEMARK OFFICE
CERTIFICATE OF CORRECTION

| | |
|---|---|
| PATENT NO. | : 11,729,675 B2 |
| APPLICATION NO. | : 17/134872 |
| DATED | : August 15, 2023 |
| INVENTOR(S) | : Weiwei Chong and Xiaobo Wu |

It is certified that error appears in the above-identified patent and that said Letters Patent is hereby corrected as shown below:

In the Claims

In Claim 10, Column 48, Line 40, delete "the voice service of the terminal device ca is not" and insert --the voice service of the terminal device is not--.

Signed and Sealed this
Thirty-first Day of October, 2023

Katherine Kelly Vidal
*Director of the United States Patent and Trademark Office*